United States Patent
Bowman et al.

[19]

[11] Patent Number: 5,999,623
[45] Date of Patent: Dec. 7, 1999

[54] BROADCAST DATA ACCESS CONTROLLER COMMUNICATION SYSTEM

[75] Inventors: Philip J. Bowman, Pleasanton; Paul A. Monte, San Jose; Robert A. Wiedeman, Los Altos, all of Calif.

[73] Assignee: Globalstar L.P., San Jose, Calif.

[21] Appl. No.: 08/964,539

[22] Filed: Nov. 5, 1997

[51] Int. Cl.$^6$ .................. H04N 5/04; H04L 9/08
[52] U.S. Cl. .................. 380/20; 380/21; 380/49
[58] Field of Search .................. 380/20, 21, 49; 348/5.5; 395/186

[56] References Cited

U.S. PATENT DOCUMENTS

| | | | |
|---|---|---|---|
| 4,937,866 | 6/1990 | Crowther et al. | 380/20 |
| 5,303,286 | 4/1994 | Wiedeman | 379/59 |
| 5,422,647 | 6/1995 | Hirshfield et al. | 342/354 |
| 5,448,623 | 9/1995 | Wiedeman et al. | 379/59 |
| 5,619,525 | 4/1997 | Wiedeman et al. | 375/200 |
| 5,710,815 | 1/1998 | Ming et al. | 380/20 |
| 5,787,171 | 7/1998 | Kubota et al. | 380/20 |
| 5,805,707 | 9/1998 | Nakano | 380/49 |
| 5,818,933 | 10/1998 | Kambe et al. | 380/4 |
| 5,848,156 | 12/1998 | Murakami | 380/21 |
| 5,850,444 | 12/1998 | Rune | 380/21 |
| 5,852,664 | 12/1998 | Iverson et al. | 380/25 |

OTHER PUBLICATIONS

Rupf et al., "User–Separating Demodulation for Code–Division Multiple–Access Systems," IEEE J. Selected Areas in Communications, vol. 12, No. 5, pp. 786–795, Jun. 1994.

Witte et al., "A Digital Radio Processor for Channel Demodulation and Source Decoding of Satellite Radio Programs," IEEE Trans. on Consumer Electronics, vol. 42, No. 4, pp. 946–951, Nov. 1996.

*Primary Examiner*—Tod R. Swann
*Assistant Examiner*—Justin T. Darrow
*Attorney, Agent, or Firm*—Ohlandt, Greeley, Ruggiero & Perle

[57] ABSTRACT

Disclosed is a method and apparatus for enabling an authorized receiver station to decrypt encrypted information broadcast by a transmitter station, and for decrypting the information within the authorized receiver station. The method includes steps of storing a predetermined Subscription Key value in the authorized receiver station and, using the predetermined Subscription Key value, generating a Decryption Key value. In a next step the transmitter station broadcasts a signal which includes the encrypted information. After the broadcasted signal is received at the authorized receiver station, the authorized receiver station performs a predefined algorithm. The predefined algorithm uses the generated Decryption Key value to decrypt the encrypted information from the received signal.

43 Claims, 7 Drawing Sheets

BROADCAST DATA ACCESS CONTROLLER COMMUNICATION SYSTEM

FIELD OF THE INVENTION

This invention relates generally to communications systems and, in particular, to a technique for limiting the accessibility of broadcast information to authorized receiver stations.

BACKGROUND OF THE INVENTION

Owing to the high degree of efficiency that communications satellites can provide while relaying information between transmitter stations and receiver stations or terminals, communications satellites have often been employed in various types of commercial applications, enabling users of the receiver stations to be provided with a wide variety of broadcast information (e.g., voice, video and/or data). In some commercial applications (e.g., cellular telephone applications, satellite television applications, etc.), access to broadcast information is often restricted to particular, authorized receiver stations (i.e., receiver stations that are recognized as being allowed to have access to broadcast information, often in exchange for a fee), and non-authorized receiver stations are prevented from obtaining access to the broadcast information, via some known technique. For example, one known technique for restricting access to broadcast information involves broadcasting the information in an encrypted form, and, prior thereto, providing only authorized receiver stations with the capability of decrypting the information. Unfortunately, however, conventional systems employing encryption techniques tend to be arduous and expensive to implement, and, in at least some of these systems, the encrypted information can often be easily decrypted using an appropriate decryption algorithm in a non-authorized receiver station. It can therefore be appreciated that it would be desirable to provide a communication system that overcomes these problems, and which prevents non-authorized receiver stations from obtaining access to broadcast information, while enabling authorized receiver stations to obtain access to the broadcast information.

OBJECT OF THE INVENTION

It is an object of this invention to provide an improved technique for preventing non-authorized receiver stations from obtaining access to broadcast information, and for enabling only authorized receiver stations to have access to the broadcast information.

Further objects and advantages of this invention will become apparent from a consideration of the drawings and ensuing description.

SUMMARY OF THE INVENTION

The foregoing and other problems are overcome and the objects of the invention are realized by a Broadcast Data Access Controller (BDAC) Communication System that is constructed in accordance with the invention, and by a method for enabling only authorized ones of a plurality of receiver stations to decrypt encrypted information transmitted from a transmitter station. The method comprises a first step of performing a first predefined algorithm at the transmitter station to generate Subscription Key values for the respective authorized receiver stations. The first predefined algorithm is preferably a function of a predetermined Decryption Key value that must be generated by the authorized receiver stations in order for these receiver stations to be able to decrypt encrypted information transmitted by the transmitter station. In one embodiment of the present invention, the first predefined algorithm generates Subscription Key values for the respective authorized receiver stations using a User Key value which identifies the respective authorized receiver stations and the predetermined Decryption Key value.

A next step includes providing the generated Subscription Key values to the respective authorized receiver stations. In accordance with one embodiment of the invention, the Subscription Key values may be provided to the authorized receiver stations by way of an information signal transmitted from the transmitter station. In other embodiments of the invention, the Subscription Key values may be provided directly to users of the authorized receiver stations, in which case the users then enter these values into the respective authorized receiver stations using a suitable user-interface.

At each one of the authorized receiver stations, a next step includes performing a second predefined algorithm which employs the provided Subscription Key value. The performance of the second predefined algorithm results in the generation of a resultant value which equals the Decryption Key value.

A next step includes broadcasting a first signal from the transmitter station. The first signal preferably includes the encrypted information. After receiving the first signal broadcast from the transmitter station, each individual one of the authorized receiver stations performs a third predefined algorithm. The third predefined algorithm uses the resultant value to decrypt the encrypted information received within the first signal from the transmitter station. In this manner, each authorized receiver station decrypts the encrypted information transmitted from the transmitter station, and thus obtains access to the information in its decrypted form.

BRIEF DESCRIPTION OF THE DRAWINGS

The above set forth and other features of the invention are made more apparent in the ensuing Detailed Description of the Invention when read in conjunction with the attached Drawings, wherein.

Identically labeled elements appearing in different ones of the figures refer to the same elements but may not be referenced in the description for all figures.

DETAILED DESCRIPTION OF THE INVENTION

Figure 1:
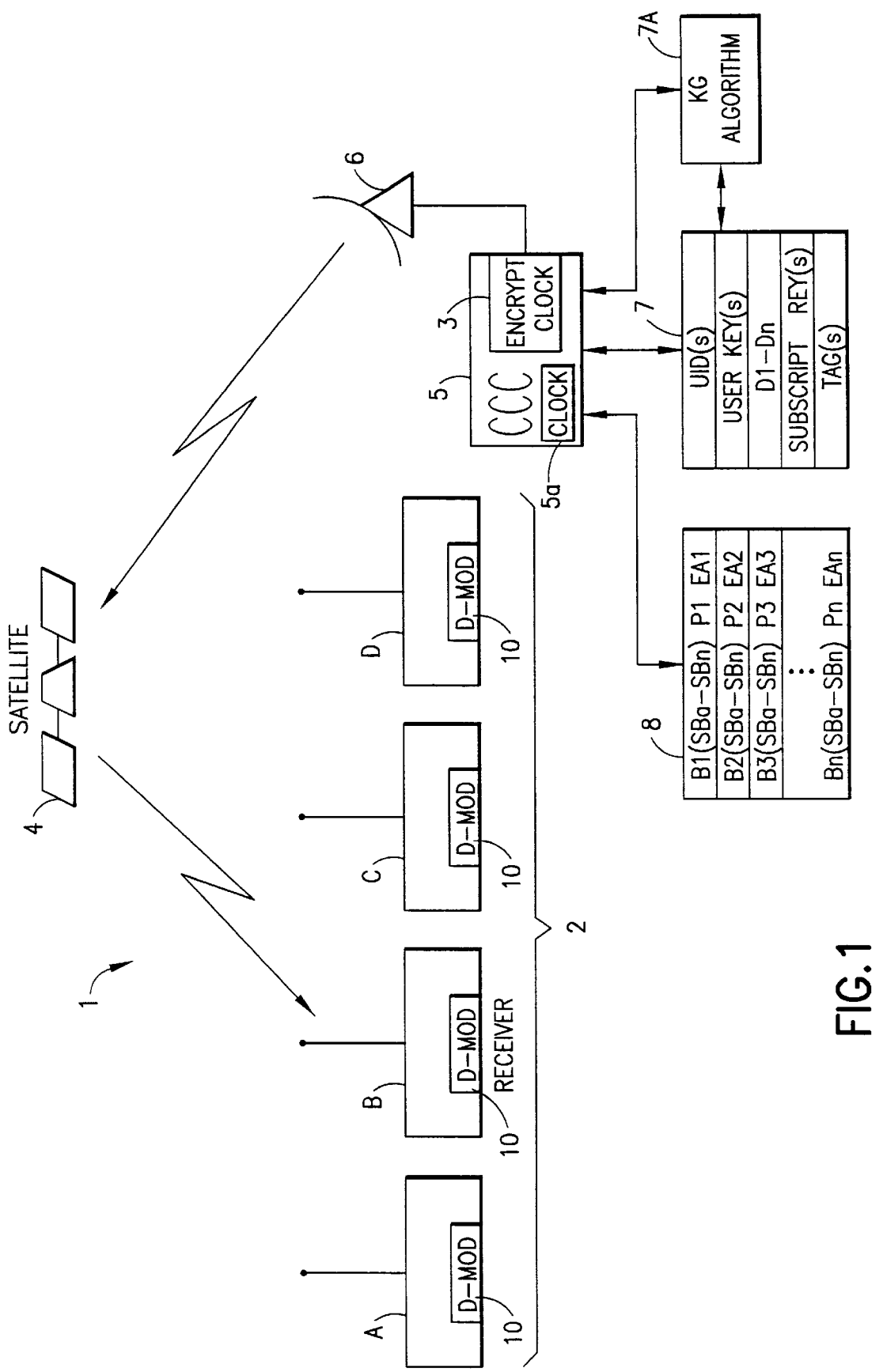
FIG. 1 depicts a Broadcast Data Access Controller (BDAC) communication system that is constructed in accordance with this invention.

FIG. 1 illustrates a Broadcast Data Access Controller (BDAC) communication system 1 that is constructed in accordance with the invention. The BDAC communication system 1 includes a transmitter station 6, a Communications Control Center (CCC) 5, a data table 7, a Program Schedule Table (PST) 8, a communication satellite 4, and one or more receiver stations or terminals 2 that include a Decryption module (D-module) 10 in accordance with the invention. Individual ones of the receiver stations are further identified as receiver stations (A–D).

It should be noted that although the BDAC communication system of the invention is described in the context of being employed in a communication system having only a single satellite, it is not intended that the invention be so limited, and the invention may also be employed in communication systems having more than one satellite. By example, the invention may also be employed in communication systems having a constellation of satellites, such as those described in commonly assigned U.S. Pat. No. 5,619,525, issued Apr. 8, 1997, entitled "Closed Loop Power Control For Low Earth Orbit Satellite Communications System", by Robert Wiedeman et al., U.S. Pat. No. 5,422,647, issued Jun. 6, 1995, entitled "Mobile Communication Satellite Payload", by Edward Hirshfield et al., U.S. Pat. No. 5,448,623, issued Sep. 5, 1995, entitled "Satellite Telecommunications System Using Network Coordinating Gateways Operative With a Terrestrial Communication System", by Robert Wiedeman et al., and U.S. Pat. No. 5,303,286, issued Apr. 12, 1994, entitled "Wireless Telephone/Satellite Roaming System", by Robert Wiedeman. The disclosures of these U.S. patents are incorporated by reference herein in their entireties. The satellite 4 employed in the invention may be a low earth orbit (LEO) satellite, a medium earth orbit (MEO) satellite, or a geosynchronous earth orbit (GEO) satellite.

The Communications Control Center 5 functions to coordinate the transmission of information by the transmitter station 6, as well as to generate certain values that are used within the BDAC communication system 1, as will be further described below. Associated with the Communication Control Center 5 is the Program Schedule Table 8. In accordance with a preferred embodiment of the invention, the Program Schedule Table 8 includes one or more blocks of information B1–Bn (each of which may include one or more sub-blocks of information (SBa–SBn)) and information specifying corresponding predetermined encryption algorithms EA1–EAn. Also, in accordance with one embodiment of the invention, the PST 8 includes information specifying particular, predetermined time periods P1–PN (each of which includes a time duration that begins at a predetermined start time) that correspond to the respective blocks of information B1–Bn. The Communications Control Center 5 employs the information stored in the PST 8 to encrypt the blocks of information B1–Bn in accordance with the respective encryption algorithms EA1–EAn, using an encryption processing block 3, as will be described below.

The Communications Control Center 5 also employs the information stored in the PST 8 to control the transmitter station 6 so as to broadcast the encrypted blocks of information B1–Bn either during the respective predetermined time periods P1–Pn, or on an as-needed basis, as will also be described below.

Depending on applicable performance requirements for the BDAC communication system 1, the blocks of information B1–Bn may include any suitable type of information. By example, the blocks of information B1–Bn may include information desired to be obtained by users of the receiver stations 2, including video messages (e.g., television program information), voice messages, data messages, and/or any other suitable types of messages. These messages may include by example, weather information, stock market information, traffic information, and/or Global Positioning System (GPS) information (such as that relating to the position of a vehicle or other object being tracked).

Also, the respective encryption algorithms EA1–EAn may include any suitable type of encryption algorithm known in the art, and each of the encryption algorithms may be a unique encryption algorithm or may be similar to other ones of the encryption algorithms. Thus, the BDAC communication system enables the use of any general type encryption scheme, for example, the Data Encryption Standard (DES).

Moreover, in accordance with one embodiment of the invention, the duration of each time period P1–Pn, as well as the beginning time (i.e., time and date) of each respective time period P1–Pn, is predetermined. By example, for a case in which a block of information B1 includes video information having a duration of one hour, and where applicable performance criteria require that the block of information B1 be transmitted from transmitter station 6 beginning at 12 AM on Jan. 1, 1998, then the information specifying the time period P1 may specify the start time of 12 AM, Jan. 1, 1998, and a time duration of one hour. Also, depending on applicable performance criteria, no specific, predetermined time periods P1–Pn may be employed, and thus, no information specifying these time periods P1–Pn need be stored in the PST 8. For example, in this case the Communications Control Center 5 controls the transmitter station 6 (in a manner as will be described below) so as to broadcast the blocks of information B1–Bn on an as-needed basis.

Before describing further components of the BDAC communication system 1, an aspect of the invention relating to the authorization of particular ones of the receiver stations 2 will be described. In accordance with the invention, a receiver station (A–D) may be authorized for particular ones of the time periods P1–Pn. That is, a receiver station (A–D) may be authorized to decrypt as many encrypted sub-blocks of information (SBa–SBn) as are broadcast from the transmitter station 6 throughout the durations of particular ones of the time periods P1–Pn. Also in accordance with the invention, for a case in which one or more of the blocks of information B1–Bn are broadcast in an encrypted form from transmitter station 6 on an as-needed basis, a receiver station (A–D) may be authorized to decrypt particular ones of the encrypted blocks of information B1–Bn (broadcast by the transmitter station 6 after the receiver station becomes authorized). A receiver station (A–D) may become authorized by, for example, a user of the receiver station contacting an operator of the CCC 5 and requesting that the particular receiver station be authorized for particular ones of the time periods P1–Pn, or be authorized to decrypt particular ones of the encrypted blocks of information B1–Bn. Thereafter, the receiver station (A–D) may be deemed "authorized", and Subscription Key value(s) corresponding to the information for which the receiver station (A–D) is authorized to decrypt, are generated by the CCC 5, and are then stored in data table 7, as will be described below. The manner in which a receiver station (A–D) becomes "authorized" may be in accordance with any suitable technique, and will not be described in further detail herein.

Referring again to FIG. 1, the data table 7 will now be described. According to a presently preferred embodiment of the invention, the data table 7 is accessed by a predefined algorithm, namely a Key-Generator (KG) algorithm 7A, and stores a plurality of constants and variables, including one or more User Identification (UID) values, Subscription Key (S-Key) values, Tag values, User Key (U-Key) values, and Decryption Key (D-Key) values D1–Dn.

The UID and U-Key values correspond to respective UID and U-Key values that are pre-assigned to, and preferably prestored in, the receiver stations 2, and which are employed by authorized ones of the receiver stations 2 to decrypt encrypted information received by these stations 2 from transmitter station 6, as will be further described below.

The KG algorithm 7A is employed by the Communications Control Center 5 to generate the S-Key values which, after being generated, are provided to the authorized receiver stations 2 wherein they are employed in a corresponding KG algorithm, as will also be further described below. Preferably, the KG algorithm 7A specifies a predefined relationship between a respective D-Key value and one or more of the constants and/or variables (e.g., a UID value, a S-Key value, and/or a U-Key value) stored in the data table 7 (and corresponding to values stored in receiver stations (A–D)). The relationship may be defined in accordance with any suitable encryption algorithm employed in the art. By example only, and for the purposes of this description, it is assumed that the KG algorithm is defined in accordance with the following algorithm (1):

$$D\text{-}Key = U\text{-}Key + S\text{-}Key \quad (1)$$

It should be noted that, in practice, the KG-Algorithm 7A may be more or less complex than in this example. Also, the KG algorithm may specify another relationship that includes a selected combination of D-Key values, S-Key values, UID values, and/or U-Key values.

Each D-Key value D1–Dn preferably corresponds to a particular one of the encryption algorithms EA1–EAn stored in the PST 8. Each D-Key value D1–Dn specifies a value which must be generated by authorized ones of the receiver stations 2 in order for these receiver stations to be able to decrypt information encrypted in accordance with a respective one of the encryption algorithms EA1–EAn. For a case in which one or more of the receiver stations 2 are authorized to decrypt as many encrypted sub-blocks of information (SBa-SBn) as are broadcast from the transmitter station 6 during particular ones of the time periods P1–Pn, there are D-Key values D1–Dn stored in data table 7 corresponding to each of these particular time periods P1–Pn. Also, for a case in which one or more of the receiver stations are authorized to decrypt particular ones of encrypted blocks of information B1–Bn broadcast by the transmitter station 6 during unspecified time periods (i.e., on an as needed basis), there are D-Key values D1–Dn stored in data table 7 corresponding to each of these particular blocks of information B1–Bn. The D-Key values D1–Dn are related to the corresponding encryption algorithms EA1–EA2 in a predefined manner, and in accordance with any suitable known relationship between encryption algorithms and decryption keys.

The S-Key values stored in data table 7 will now be described. The S-Key values are determined by the Communications Control Center 5 using the KG algorithm 7A. As was previously described, the S-Key values are generated by the Communications Control Center 5 to enable authorized ones of the receiver stations 2 to decrypt received blocks of information B1–Bn encrypted in accordance with encryption algorithms EA1–EAn. In determining S-Key values for an authorized receiver station (A–D), and assuming that the KG algorithm 7A is similar to the algorithm (1) above, the values employed by the CCC 5 for the variables "S-Key" and "U-Key" in algorithm (1), are those values (from data table 7) corresponding to the respective S-Key and U-Key values of the authorized receiver station (A–D). Also, the value employed by the Communications Control Center 5 for the variable "D-Key" in algorithm (1) is the D-Key value (D1–Dn from data table 7) corresponding to the D-Key value which must be generated by the authorized receiver station in order for it to be able to decrypt the encrypted information.

As an example of the manner in which the Communications Control Center 5 determines a S-Key value, it is assumed that 1) a User (not shown) of a receiver station (A), where the receiver station (A) has an associated U-Key value of "10" and an associated UID value of "2", requests that the receiver station (A) be authorized to decrypt a block of information B1, 2) the block of information B1 is to be broadcast by transmitter station 6 during an unspecified future time period in an encrypted form defined in accordance with encryption algorithm EA1, 3) the KG algorithm 7A and the KG algorithm employed by the receiver station (A) are each similar to the algorithm (1) above, and 4) the D-Key value which must be generated by receiver station (A) in order for it to be able to decrypt the block of information B1 encrypted in accordance with encryption algorithm EA1 is equal to the value "100". In this case, after the receiver station (A) becomes authorized, the Communications Control Center 5 performs the KG algorithm 7A employing the U-Key value of "10" and the D-Key value of "100". As can be appreciated, in this case the performance of the KG algorithm 7A by the Communications Control Center 5 results in the CCC 5 generating a S-Key value of "90". This value is stored in data table 7, and is subsequently provided to the authorized receiver station (A) wherein it is employed to decrypt the encrypted block of information B1, as will be described below.

In accordance with a preferred embodiment of the invention, the Tag values stored in the data table 7 correspond to respective ones of the S-Key values generated by the CCC 5 and stored in data table 7. In one embodiment, when a S-Key value is provided to an authorized receiver station (A–D), the Tag value corresponding to the S-Key value is also provided to the authorized receiver station (A–D), as will be further described below.

Figure 2:
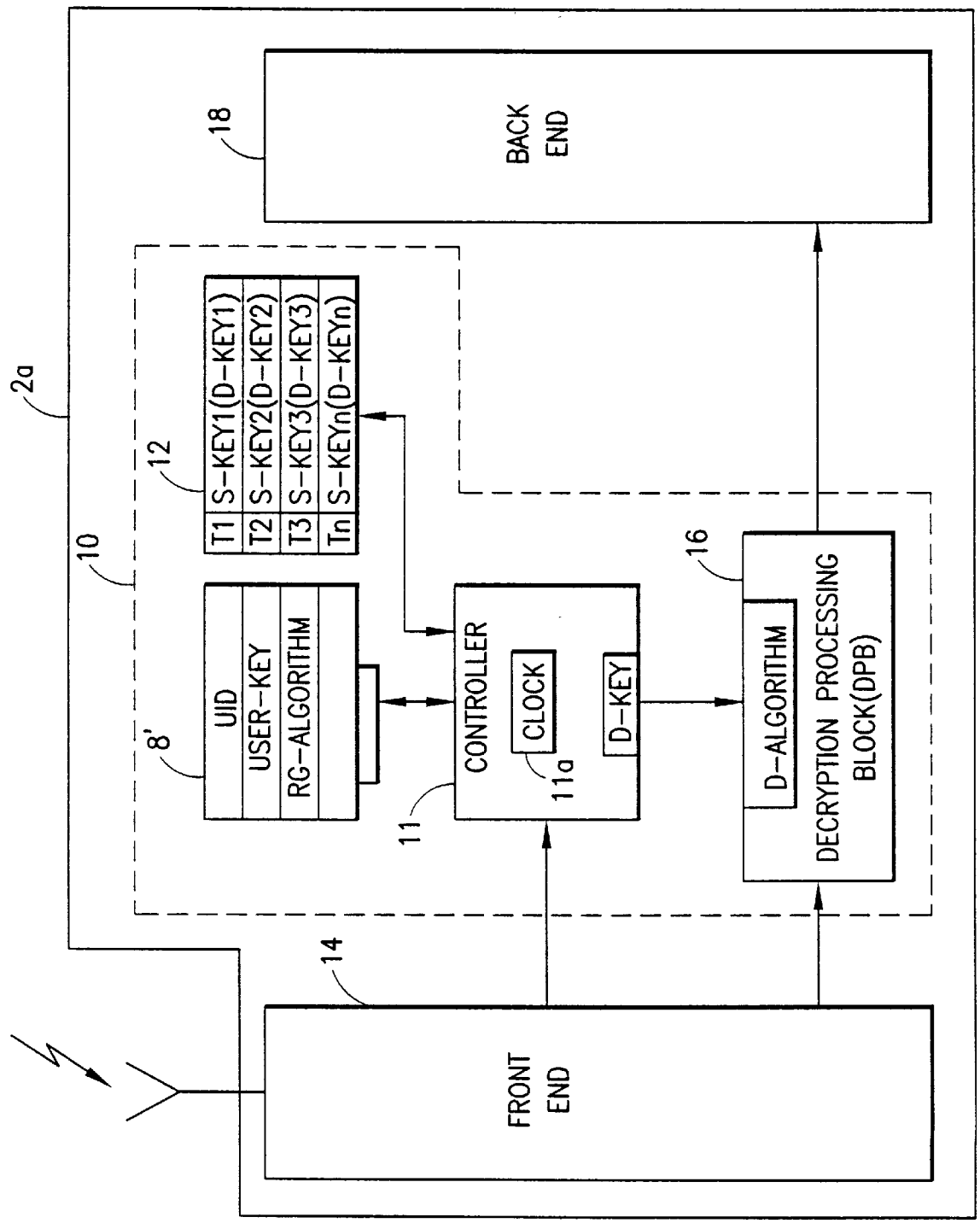
FIG. 2 is a block diagram of a receiver station of the BDAC communication system of FIG. 1, including a Decryption module (D-module) 10, and front and rear end components 14 and 18.

Before describing the manner in which S-Key values and Tag values are provided by the CCC 5 to the authorized ones of the receiver stations 2, reference will first be made to FIG. 2. In FIG. 2, a block diagram is shown which represents an individual one of the receiver stations 2. The receiver station is referenced by label "2a" in FIG. 2, and is constructed and operated in accordance with the invention. The receiver station 2a includes a front end portion 14, a back end portion 18, and a Decryption module (D-module) 10. Within the receiver station 2a, the D-module 10 is employed to decrypt encrypted information received by the front end block 14 from the transmitter station 6, for cases in which the receiver station 2a is authorized to decrypt this information. The manner in which the D-module 10 operates to decrypt the information will be further described below.

Figure 6:
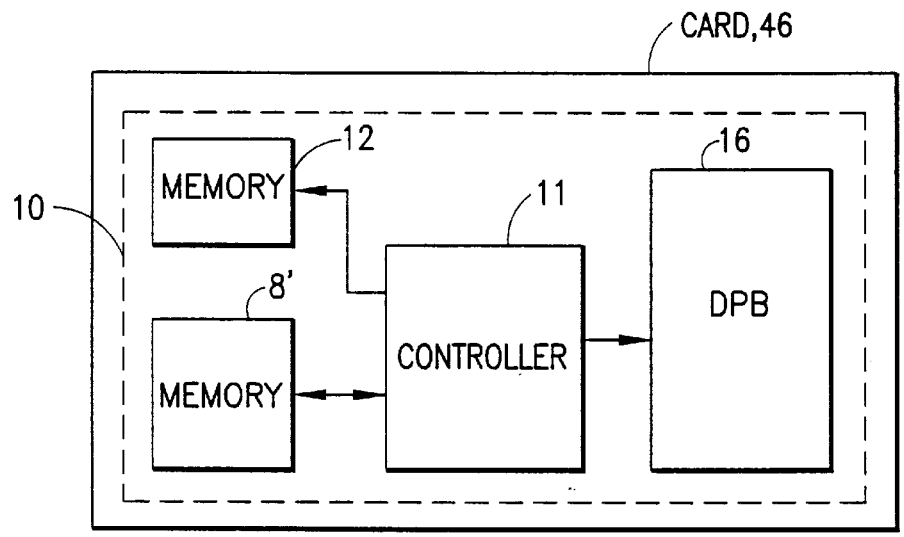
FIG. 6 shows the D-module 10 of FIG. 2 incorporated on a card or cartridge 46.
Figure 7:
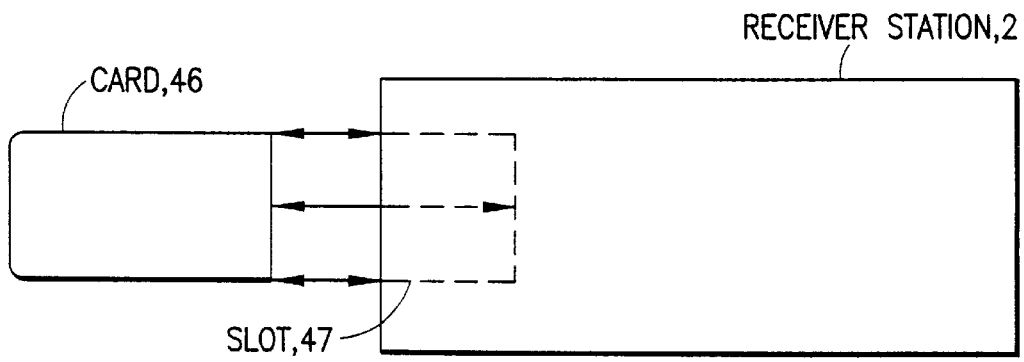
FIG. 7 shows the cartridge 46 of FIG. 6 and the receiver station of FIG. 2, wherein the cartridge 46 can be inserted into the receiver station 2 for connecting to receiver station circuitry.

In accordance with one embodiment of the invention, the D-module 10 is incorporated as an integral component of the receiver station 2a. In accordance with another embodiment of the invention, and referring to FIGS. 6 and 7, the D-module 10 is incorporated on a component 46, such as card (e.g., a "smart card") or a cartridge. Also in this embodiment of the invention, each of the receiver stations 2 (including receiver station 2a) includes a slot 47 which is adapted for receiving component 46. As such, a single one of the components 46 can be inserted into the slot 47 of any one of the receiver stations 2, enabling the D-module 10 to be coupled to the front and back end portions 14 and 18 of the respective receiver stations 2.

In accordance with a presently preferred embodiment of the invention, and referring again to FIG. 2, the D-module 10 comprises a controller 11, a memory 8', a Decryption Processing Block (DPB) 16, and a memo 12. The memory 8' stores values of at least two pre-defined constants, namely the User Identifier (UID) and User Key (U-Key) values of the receiver station 2a. Preferably, each of the receiver stations 2 has a unique UID value and a unique U-Key value. The manner in which these values are used in these receiver stations 2 will be described below.

The memory 8' also stores a predefined algorithm, namely the Key-Generator (KG) algorithm, which was described above. The KG algorithm is performed by the controller 11 of the D-module 10 and results in the controller 11 generating a D-Key value for receiver station 2a. In one embodiment of the invention, the KG algorithm is performed by the controller 11 in response to the controller 11 receiving encrypted information (and/or a respective Tag value) from the front end portion 14. The D-Key value generated as a result of the performance of the KG algorithm is then forwarded to the Decryption Processing Block (DPB) 16 for decrypting the encrypted information, as will be described below. In other embodiments of the invention, the KG algorithm is performed at some time after an S-Key value is provided to the receiver station, but prior to the receiver station receiving the encrypted information from the transmitter 6 (i.e., in one embodiment the KG algorithm is performed immediately in response to the receiver station 2a receiving the S-key value from transmitter station 6, and in another embodiment the KG algorithm is performed upon a clock 11a reaching a particular time of a particular date specified by a time tag). For these latter embodiments, the D-Key value generated as a result of the performance of the KG algorithm is stored in the receiver station 2a until the encrypted information is received. Thereafter, in response to the encrypted information being received, the D-Key value is forwarded to the DPB 16. These aspects of the invention, and the manner in which the KG algorithm is performed by the controller 11, will be further described below.

Reference is now made to the Decryption Processing Block (DPB) 16 of the receiver station 2a, shown in FIG. 2. Upon the D-Key value being provided to the DPB 16 from the controller 11, the DPB 16 performs a pre-stored Decryption algorithm (D-algorithm) in response to receiving the D-Key value from the controller 11. The D-algorithm stored in the DPB 16 may be defined in accordance with any suitable type of decryption algorithm. Preferably, the D-algorithm is related to each of the encryption algorithms EA1–EAn in a manner so that, after the controller 11 of the receiver station 2a provides the D-Key value to the DPB 16 and the DPB 16 performs the D-algorithm, encrypted information received by the receiver station 2a is decrypted by the DPB 16, for the case in which the receiver station 2a is authorized to decrypt this information. The manner in which the D-algorithm is performed within the DPB 16 will be described in greater detail below. Also, the DPB 16 may be constructed in accordance with any suitable type of circuit for performing a decryption algorithm to decrypt encrypted information.

The memory 12 of the D-module 10 will now be described. In accordance with a preferred embodiment of the invention, the memory 12 is a non-volatile, read/write memory. After the receiver station 2a becomes authorized in the manner described above, S-Key and associated Tag values are provided to the receiver station 2a (the manner in which S-Key and Tag values are provided to and stored within authorized receiver stations will be described below). In one embodiment, the provided S-Key values and associated Tag values are stored in the memory 12 at memory locations identified by the Tag values. In another embodiment, and as was previously described, in response to receiving the S-Key and Tag values, the controller 11 immediately performs the KG algorithm in response to receiving respective ones of the provided S-Key values to generate corresponding D-Key values. For this embodiment, after the D-Key values are generated, the D-Key values and the Tag values corresponding to the S-Key values (that caused the respective D-Key values to be generated) are stored in the memory 12, at memory locations identified by the respective Tag values.

As previously described, within the memory 12, each of the S-Key values or D-Key values is preferably stored at a unique storage location that is identified by a corresponding, unique one of the Tag values. The number of S-Key values or D-Key values and corresponding Tag values stored in the memory 12 of the receiver station 2a depends on the total number of time periods P1–Pn for which the receiver station 2a is authorized to decrypt information transmitted by the transmitter station 6, and/or the total number of blocks of information B1–Bn the receiver station 2a is authorized to decrypt. By example and in accordance with one embodiment where the S-Key values are stored rather than the D-Key values, assuming that the receiver station 2a is authorized to decrypt information that is transmitted from the transmitter station 6 during time periods P1, P2, and P3, then the memory 12 stores 1) a Tag value (T1) and a S-Key value (S-Key1) which correspond to the time period P1, 2) a Tag value (T2) and a S-Key value (S-Key2) which correspond to the time period P2, and 3) a Tag value (T3) and a S-Key value (S-Key3) which correspond to the time period P3. Assuming a similar example, but that the embodiment is employed where the D-Key values are generated in response to the receiver station 2a receiving S-Key values, the memory 12 stores 1) Tag value (T1) and a D-Key value (D-Key1) which correspond to the time period P1, 2) Tag value (T2) and a D-Key value (D-Key2) which correspond to the time period P2, and 3) Tag value (T3) and a D-Key value (D-Key3) which correspond to the time period P3. Also by example, assuming that the receiver station 2a is authorized to decrypt blocks of information B1–B4 that are to be transmitted from transmitter station 6 during some unspecified future time period (i.e., on an as needed basis), and that the embodiment is employed wherein the S-Key values are stored, memory 12 stores respective Tag value (T1)–(T4) and respective S-Key values (S-Key1)–(S-Key4). Further by example, assuming that the receiver station 2a is authorized to decrypt blocks of information B2 and B4 that are to be transmitted from transmitter station 6 during some unspecified future time period, and that the embodiment is employed wherein the S-Key values are stored, then the memory 12 stores respective Tag values (T2) and (T4), and respective S-Key values (S-Key2) and (S-Key4). As can be appreciated from the examples above, the number of S-Key or D-Key values and corresponding Tag values stored in memory 12 of an authorized receiver station 2 varies, depending on the number of time periods P1–Pn for which the receiver station is authorized to decrypt information, or, for the case where the encrypted information is transmitted from transmitter station 6 on an as-needed basis, on the number of blocks of information B1–B4 the receiver station is authorized to decrypt.

The manner in which S-Key and Tag values are provided by the CCC 5 to the authorized ones of the receiver stations 2 may be in accordance with various embodiments of the invention, and will now be described. Preferably, the S-Key and Tag values are provided to the authorized receiver stations before the transmitter station 6 broadcasts information which the receiver stations are authorized to decrypt. The particular time period during which the S-Key and Tag values are provided to the authorized receiver stations may be selected in accordance with applicable operational criteria.

In one embodiment of the invention, after one or more receiver stations 2 become authorized, S-Key and Tag values are provided to the authorized receiver stations by way of an information signal transmitted from the transmitter station 6. In this embodiment of the invention, the Communications Control Center 5 controls the transmitter station 6 to transmit the information signal during a time interval when no encrypted blocks of information B1–Bn are being transmitted (e.g., during a time interval that is between those during which encrypted information is broadcast from transmitter station 6). The information signal preferably has data fields that are similar to those shown in FIG. 1b. As can be appreciated in view of FIG. 1b, the information signal includes a New Subscriber Synchronization Field (DF1), and one or more data fields (DF1–DFn), the number of which depends on the total number of receiver stations 2 to which S-Key and Tag values are being provided by way of the information signal.

The New Subscriber Synchronization Field notifies each of the one or more receiver stations 2 that particular unencrypted data (e.g., S-Key values, UID values, and/or Tag values) is being sent. Preferably, the New Subscriber Synchronization Field is implemented as a unique bit pattern, or a bit pattern which occurs only rarely (for example, a string of bits which includes a 128 bits of alternating zeroes and ones followed by an 8 bit pattern of zeroes). Thus, each of the one or more receiver stations 2 detects the unique bit pattern as the New Subscriber Synchronization Field and recognizes that the next fields to be transmitted by the transmitter station 6 includes a series of UIDs, S-Keys and Tag values. As such, the New Subscriber Synchronization Field is a mechanism to notify each of the one or more receiver stations 2 that unencrypted new subscriber data is being transmitted. As long as both the CCC 5 and receiver stations 2 have knowledge of the unique bit pattern prior to the transmission of the information signal, any pattern of bits may be utilized. By example, after a receiver station 2 becomes authorized to decrypt encrypted information, and prior to the transmitter station 6 transmitting the information signal (including the New Subscriber Synchronization Field), the CCC 5 may generate the unique bit pattern and provide the bit pattern to the authorized receiver stations (A–D) by way of transmitter station 6. After receiving the bit pattern, the receiver stations (A–D) store the bit pattern in memory 12. Thereafter, and after the information signal including the New Subscriber Synchronization Field is provided to the receiver stations (A–D), the controller 11 of the respective receiver stations (A–D) compares the bit pattern from the New Subscriber Synchronization Field to the bit pattern stored in memory 12. Assuming that the controller 11 of a respective authorized receiver station (A–D) determines that these bit patterns are equal to one another, then the receiver station recognizes that unencrypted new subscriber information (e.g., UID values, S-Key values, Tag values) is included in the data field following the New Subscriber Synchronization Field from the received information signal.

In practice, it may occur that the bit pattern representing the New Subscriber Synchronization Field randomly occurs within encrypted blocks of information B1–Bn. Although the occurrence of the bit pattern (in the encrypted information) is not intended to notify the receiver stations 2 that unencrypted data is being sent (as it does when included in the New Subscriber Synchronization Field), the receiver stations 2 may nevertheless interpret the bit pattern as indicating that the New Subscriber Synchronization Field has been received. Therefore, it is within the scope of this invention to employ a mechanism within the encryption and decryption algorithms which enables the suppression of the detection of the information indicating the New Subscriber Synchronization Field in the encrypted information. For example, the suppression mechanism may be implemented as a second bit pattern which is appended to the 128 bit pattern of alternating ones and zeroes that is encountered during the encryption process to indicate that the encountered 128 bit pattern is not intended to identify the New Subscriber Synchronization Field. The second bit pattern may be included in the unique bit pattern originally provided to the individual receiver stations (A–D) after becoming authorized, and stored in the memory 12 for subsequent comparison to a received signal in the manner described above. For example, the second bit pattern may be a 2 bit pattern of ones. In operation, and during the encryption process performed within CCC 5, the suppression mechanism instructs the encryption algorithm to append the 2 bit pattern at the end of an encountered 128 bit pattern of alternating ones and zeroes. The suppression mechanism thus informs the receiver stations that the bit pattern should not be interpreted as the New Subscriber Synchronization field. Once received by the receiver stations, and after the receiver stations determine that the second bit pattern is included in the received signal (by comparing these bits the those stored in memory 12), the decryption algorithm within each receiver station deletes the 2 bit pattern from the signal such that the integrity of the original data stream is not compromised, and enables the encrypted information to be decrypted in the manner to be described below.

In another embodiment of the New Subscriber Synchronization Field, an embodiment in which, for example, new subscriber data is transmitted at a predetermined time period (e.g., at midnight of each day) or at a unique predetermined frequency, the New Subscriber Synchronization Field may be omitted, assuming that the authorized receiver stations (A–D) have been pre-notified by CCC 5 of the predetermined time period or unique predetermined frequency. In other words, the transmitter station 6 does not need to notify each of the one or more receiver stations 2 that a transmission is of unencrypted new subscriber data since each of the receiver stations interprets the transmission at the predetermined time period or frequency as containing new subscriber data.

Referring again to FIG. 1b, each of the data fields (DF2–DFn) includes information (non-encrypted new subscriber data) specifying the UID value of a respective one of the authorized receiver stations (A–D), a Tag value, and an associated S-Key value. The data fields enable the receiver station (A–D) to decrypt information for which it is authorized.

Figure 1A:
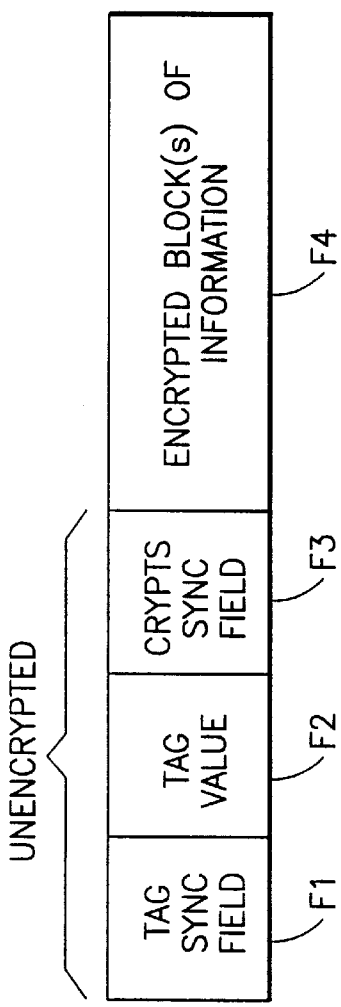
FIG. 1a shows data fields of a signal broadcast by a transmitter station of the BDAC communication system of FIG. 1, wherein the signal includes encrypted information.
Figure 1B:
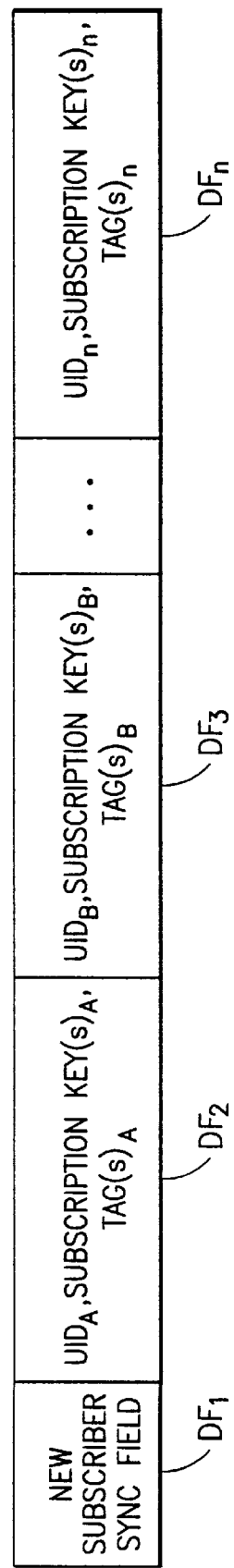
FIG. 1b shows data fields of another signal broadcast by the transmitter station of the BDAC communication system of FIG. 1, wherein the signal includes Subscription Key information.

An example of the manner in which the Communications Control Center 5 controls the transmitter station 6 to transmit an information signal having data fields similar to those shown in FIG. 1b is now discussed, wherein it is assumed that the embodiment employed is one where S-Key values are stored in memory 12 rather than D-Key values. For this example, it is assumed that prior to a lapse of time period P2, at the requests of users of two receiver stations 2, namely, receiver station (A) and receiver station (B), the receiver stations (A) and (B) become authorized to decrypt encrypted information that is to be broadcast from the transmitter station 6 during time periods P3 and P4. It is also assumed that memory 8' of receiver station (A) stores a UID value ($UID_A$) (such as, e.g., 580407), and that memory 8' of receiver station (B) stores a UID value ($UID_B$) (such as, e.g., 480102). In this example, the Communications Control Center 5 controls the transmitter station 6 to transmit a signal including data fields (DF1), (DF2), and (DF3), during a predetermined time interval before the beginning of the time period P3. The data field (DF2) includes information specifying 1) UID value ($UID_A$) (e.g., 580407) of the receiver station (A), 2) respective S-Key values (S-Key3) and (S-Key4) (e.g., "153" and "132") determined by the Communications Control Center 5 in the manner described above for enabling the receiver station (A) to decrypt information to be transmitted from transmitter station 6 during time periods P3 and P4, and 3) associated Tag values (T3) and (T4). Also in this example, the data field (DF3) includes information specifying 1) UID value ($UID_B$) (e.g., 480102) of the receiver station (B), 2) respective S-Key values (S-Key3) and (S-Key4) (e.g., "189" and "168") determined by the Control Center 5 in the manner described above for enabling the receiver station (B) to decrypt information to be broadcast from transmitter station 6 during time periods P3 and P4, and 3) associated Tag values (T3) and (T4).

After the information signal is transmitted by the transmitter station 6, the information signal is relayed by the communication satellite 4 to individual ones of the receiver stations 2 that are in view of the satellite 4. Within each of these respective receiver stations (e.g., receiver stations (A–D)), the signal is demodulated to baseband by the front end block 14 of the respective receiver station. The front end block 14 then forwards the UID value ($UID_A$), S-Key values (S-Key3, S-Key4), and associated Tag values (T3, T4) from data field (DF2) to the controller 11 of each of the respective receiver stations. In response to receiving this information from the front end block 14, the controller 11 compares the received UID value ($UID_A$) to the UID value stored in the memory 8' of the respective receiver station (A–D).

Within each of the respective authorized receiver stations, for example receiver station (A), the controller 11 compares the received UID value to the UID value stored in memory 8'. If the controller 11 determines that the received UID equals the UID stored in memory 8', the controller 11 provides the S-Key values (S-Key3, S-Key4) and associated Tag values (T3, T4) from data field (DF2) to the memory 12 of the respective authorized receiver stations (in this example, receiver station (A)), wherein these values are stored. Preferably, the S-Key values (S-Key3, S-Key4) and the Tag values (T3, T4) are stored in such a manner that the S-Key values (S-Key3, S–Key4) are located at respective storage locations of memory 12 identified by the respective Tag values (T3, T4). Within the receiver station (A), the S-Key values (S-Key3, S-Key4) are subsequently employed by the controller 11 to perform a decryption of received information (which was broadcasted from transmitter station 6 during respective time periods P3 and P4). The manner in which the decryption is performed will be further described below.

Being that in the preferred embodiment of the invention the UID value of each receiver station 2 is unique, it can be appreciated that within the other receiver stations 2 which received the information signal including the data field (DF2), the comparison of the UID value ($UID_A$) from data field (DF2) to the UID value stored in the memory 8' of these receiver stations 2 does not result in a determination that the received and stored UID values are equal. As a result, the S-Key and Tag values from the information signal are not stored in these devices. For example, if one of the receiver stations 2 determines that the UID value from data field (DF2) does not match the UID value stored in the memory 8' the receiver station ignores the S-Key and Tag values associated with that record.

As noted above and in accordance with another embodiment of the invention, it is within the scope of the present invention for a receiver station to determine the D-Key values associated with each of the S-Keys, at anytime after the S-Key values have been received. By example, a D-Key value may immediately be determined by the controller 11 in response to the receiver station receiving a particular S-Key value. Therefore, in the example above and in response to the receiver station (A) receiving the S-Key values (S-Key3, S-Key4), receiver station (A) may employ the KG algorithm and S-Key values (S-Key3, S-Key4) to determine respective D-Key values that will enable the receiver station (A) to decrypt information transmitted from transmitter station 6 during time periods P3 and P4, respectively. These D-Key values (for the time periods P3 and P4) are then stored in memory 12 at memory locations identified by the associated Tag values T3 and T4.

Also by example, and in accordance with another embodiment of the invention, each of the Tag values T1–Tn may define a predetermined time (e.g., a day of a year and a time of the day corresponding to a start time of a respective predetermined time period P1–Pn). In this embodiment, the controller 11 does not immediately determine the D-Key values upon receiving the S-Key values, but instead stores the S-Key values in the memory 12 at locations identified by the Tag values, in the manner described above. In this embodiment, the controller 11 monitors an internal clock 11a (periodically, e.g., every minute or at some other predetermined time interval) and simultaneously examines the values of Tags T1–Tn to detect when the clock 11a reaches a predetermined time specified by respective ones of the Tag values T1–Tn. Upon detecting that the time specified by, for example, Tag T3 has occurred (i.e., upon determining that the clock 11a reaches the time specified by Tag T3), the controller 11 responds by retrieving a S-Key value (e.g., S-Key3) associated with Tag value T3, and then the controller 11 performs the KG algorithm using the retrieved S-Key to generate the D-Key value. The D-Key value is then used in decrypting a received encrypted signal corresponding to time period P3, in a manner as will be described below.

Referring again to the above example wherein S-Key values are stored in memory 12, and to FIGS. 1 and 2a, the manner in which the receiver stations (A–D) respond to receiving the data field (DF3) in the information signal will now be described. After each of the receiver stations (A–D) receives the information signal from the transmitter station 6, within each receiver station (A–D), the respective front end block 14 forwards the UID value, S-Key values (S-Key3, S-Key4), and associated Tag values (T3, T4) from data field (DF3) to the respective controller 11 of the respective receiver station. The respective controller 11 compares the UID ($UID_B$) value from data field (DF3) to the UID value stored in the memory 8' of the respective receiver station, in a similar manner as was described above. As can be appreciated, in this case the UID value ($UID_B$) from data field (DF3) is equal to the UID value of receiver station (B) only, and thus the S-Key and Tag values from the data field (DF3) are stored in the memory 12 of the receiver station (B) only, and are not stored in the memory 12 of the other receiver stations (A), (C), and (D).

It is also within the scope of the present invention for Tag values not to be included within the transmitted information signal, but rather be derived from a predetermined sequence and timing of data (within the information signal) defined by the CCC 5. For example, it is within the scope of the present invention for new subscriber data (previously shown in FIG. 1b) to be transmitted in a predetermined data transmission format in which a Tag value sequence is maintained. Thus, the information signal transmitted according to the predetermined Tag value sequence can be parsed such that respective S-Key values within the information signal are associated with a predetermined Tag value, for example, starting with a Tag 001 and continuing to a Tag 999 until a predetermined delimiter is encountered. Similarly, new subscriber data may be transmitted in a predetermined data transmission format in which a UID sequence is maintained, for example, in a sequence of UID1, UID2 through UIDn. In the embodiments employing derived Tag numbers or UIDs, each of the receiver stations 2 would parse the transmitted information signal and, based upon the specific order of data values within the information signal (which order is assumed to be recognized by controller 11 and predefined by CCC 5), assign corresponding, predefined values for Tag number and/or UID.

It should be noted that the total number of S-Key and Tag values provided to the receiver stations (A) and (B) in the foregoing examples is intended to be exemplary in nature, and that any other suitable number of S-Key and Tag values may be provided to an authorized receiver station in a single data field (e.g., field (DF2)), depending on, for example, the total number of blocks of information B1–Bn the receiver station is authorized to subsequently decrypt, and/or the total number of subsequent time periods P1–Pn for which the receiver station 2 is authorized. By example, for a case in which receiver station (A) is authorized to decrypt as many sub-blocks ($SB_a$–$SB_n$) of information as are to be broadcast from transmitter station 6 during time periods P1–P12, and where each time period P1–P12 corresponds to a respective one of a series of consecutive months, an information signal having data fields similar to those shown in FIG. 1b may be transmitted by transmitter station 6 to the receiver stations 2 in a similar manner as was described above. However, in this case, data field (DF2) includes twelve S-Key values (S-Key1)–(S-Key12) for receiver station (A), wherein each of which corresponds to a particular time period P1–P12.

Figure 5:
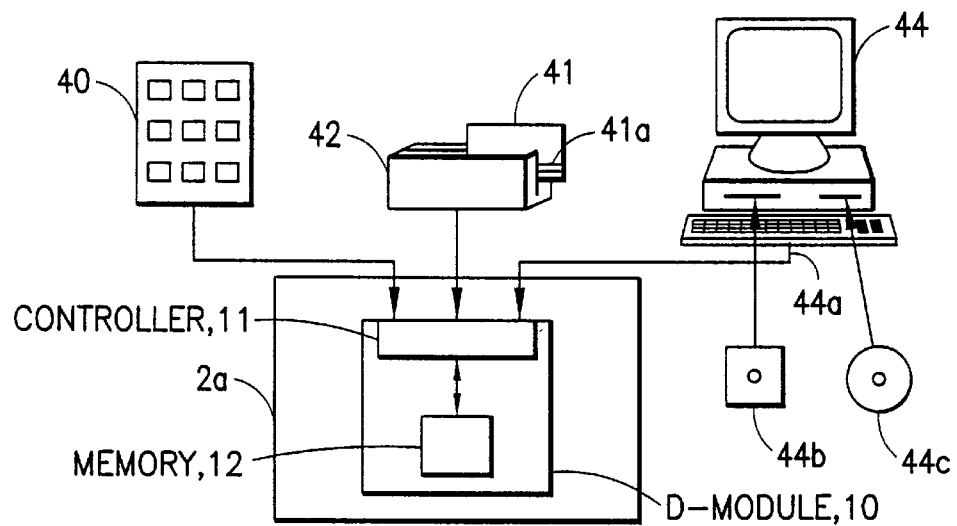
FIG. 5 shows a keypad, a card reader system, and a Computer Processing Unit (CPU) which are suitable for entering information into the D-module 10 of FIG. 2a, in accordance with the invention.

As was previously mentioned, the Tag values and the associated values of the S-Keys generated by the Communications Control Center 5 can also be provided to the authorized receiver stations (A–D) in accordance with other embodiments of the invention. In accordance with one embodiment of the invention, after a receiver station (A–D) becomes authorized, S-Key and Tag values are provided to a user of the receiver station (A–D) in some suitable form which enables the user to enter the values into the D-module 10 of the respective receiver station (A–D). For example, the values of Tags and S-Keys may be provided to the user of the receiver station (A–D) via a telephone message, a written correspondence, or some other suitable form of communication. Referring to FIG. 5, and in accordance with one embodiment of the invention, the user can then enter these values into the controller 11 of the D-module 10 of the receiver station (labelled "2a") using, for example, a keypad 40 or a CPU 44 (connected to the receiver station via, for example, phone lines 44a). In response to receiving this information, the controller 11 stores the values in the memory 12 in the manner described above. Also by example, after the S-Key and Tag values are generated by the Communications Control Center 5, these values may be stored as a code in a magnetic strip 41a of a magnetic card 41, or as information stored in a memory of a cartridge, a floppy disk 44b, a compact disk 44c, or some other suitable storage device. The storage device is then provided to the user of the authorized receiver station 2a. For a case in which the values are provided to the user on a magnetic card 41, the user can enter the values into the controller 11 of the receiver station 2a by inserting the card 41 into the card reader 42. For cases in which a floppy disk 44b or a compact disk 44c is employed, the user can load the Tag and S-Key values from the disk into the D-module 10, using, for example, the CPU 44. In response to receiving this information, the controller 11 stores the values in the memory 12, in the manner described above.

Further by example, the S-Key and Tag values can be loaded directly into the controller 11 at a service facility (not shown) (e.g., via a stand-alone smart card programmer) that is associated with the Communications Control Center 5. In this case, the user of the receiver station 2a can have the values loaded in this manner by simply bringing the receiver station 2a, or only the D-module 10 of the receiver station 2a, to the service facility where the values are then loaded into the D-module 10 using a CPU 44 or some other suitable device.

The manner in which the Communications Control Center 5, the transmitter station 6, and the authorized ones of the receiver stations 2 operate with respect to the supplying of encrypted information from the transmitter station 6 to the authorized receiver stations, will now be described. As was described above, the Program Schedule Table 8 preferably includes 1) one or more blocks of information B1–Bn, 2) information which specifies corresponding, predetermined encryption algorithms RA1–EAn, and, in accordance with one embodiment of the invention, 3) information specifying particular, predetermined time periods P1–Pn (including a start time and a time duration) that correspond to the respective blocks of information B1–Bn. In accordance with the information stored in PST 8, the Communications Control Center 5 employs the encryption processing block 3 to encrypt the respective blocks of information B1–Bn in accordance with the respective encryption algorithms EA1–EAn, and, for the embodiment wherein the information specifying time periods P1–Pn is employed in the PST 8, the CCC 5 also controls the transmitter station 6 so as to broadcast, during the respective specified time periods P1–Pn, respective signals that include data fields similar to data fields (F1)–(F4) of FIG. 1a. Also, for a case in which no information specifying the time periods P1–Pn is employed in the PST 8, (i.e., for a case in which transmissions are made on an as-needed basis), the CCC 5 controls the transmitter station 6 so as to broadcast a similar signal, but on an as-needed basis.

In a presently preferred embodiment of the invention, and referring to FIG. 1a, the data fields (F1)–(F4) include 1) a Tag Sync Field, 2) a Tag value, 3) a Crypto Sync Field, and 4) a respective block of information B1–Bn that is encrypted in accordance with a respective one of the encryption algorithms EA1–EAn. The information included in the data fields (F1)–(F3) is preferably not encrypted.

The Tag Sync Field and Crypto Sync Field are utilized in a similar fashion as was the New Subscriber Synchronization Field. That is, the Tag Sync Field and the Crypto Sync Field notify the receiver stations 2 that Tag values and encrypted data, respectively, follow. Preferably, the Tag Sync Field and the Crypto Sync Field are each implemented as a unique bit pattern. For example, the Tag Sync Field may be implemented as a string of bits which includes a predefined combination of 128 bits of alternating zeroes and ones followed by an 8 bit pattern of ones, while the Crypto Sync Field may be implemented as a string of bits which includes a 128 bits of alternating zeroes and ones followed by a 4 bit pattern of ones and a 4 bit pattern of zeroes. Thus, when each of the one or more receiver stations 2 detects the unique 128 bit pattern of alternating ones and zeroes followed by 8 bits of all zeroes, all ones, or 4 ones and 4 zeroes, the receivers are notified that either new subscriber data, Tag values, or encrypted data respectively, follows. As discussed above, as long as both CCC 5 and the receiver stations 2 have knowledge of the unique bit patterns prior to a transmission of either new subscriber data, Tag values, or encrypted data, any pattern may be utilized.

The Tag value included in data field (F2) specifies a value which, as is known to the CCC 5 based on the values stored in data table 7, will enable the respective authorized receiver stations (A–D) to retrieve a particular, "correct" S-Key value, or for the embodiment wherein D-Keys are stored in memory 12, a "correct" D-Key value. Tag value retrieval of S-Key values is possible for, as discussed above, the S-Key values previously provided to authorized receiver stations are stored in the memory 12 of the respective authorized receiver stations in locations identified by the Tag values. Therefore, the "correct" S-Key value is retrieved from memory 12 to enable the respective authorized receiver station to generate a corresponding, "correct" D-Key value. The "correct" D-Key value is used to decrypt the encrypted information from data field (F4), as will be described below. As discussed above, in one embodiment of the invention D-Key values are generated at the time the S-Key values are provided to the respective authorized receiver stations. In this embodiment, the Tag values included in data field (F2) are used to retrieve the D-Key values previously generated and stored in memory 12 at locations identified by the Tag values. A detailed discussion of the retrieval process follows.

After a first signal including, for example, the data fields shown in FIG. 1a is broadcast from the transmitter station 6, it is relayed by the satellite 4 to the receiver stations 2 that are in view of the satellite 4. Within each of these respective receiver stations 2, after the first signal is received by the front end block 14 of the respective receiver station, the first signal is demodulated and converted to baseband by the front end block 14. Thereafter, at least the encrypted information included in the respective data field (F4 of FIG. 1a) of the received signal is provided to the Decryption Processing Block (DPB) 16. In one embodiment, the Tag value from data field (F2) of the signal is also forwarded by the front end block 14 to the controller 11 of the respective receiver station. In response to receiving the Tag value from the front end block 14, the controller 11 compares the received Tag value to Tag values (T1)–(Tn) stored in the memory 12 of the D-module 10. If the controller 11 determines that one of the stored Tag values (T1)–(Tn) is equal to the received Tag value, the controller 11 retrieves the S-Key value stored at the storage location in memory 12 identified by the stored Tag value. The controller 11 then performs the KG-Algorithm stored in memory 8', using the receiver station's U-Key value and the retrieved S-Key value, to calculate a D-Key value, and then provides the D-Key value to DPB 16 which uses the D-Key value to decrypt the encrypted information in a manner as will be described below.

In an example D-Key calculation, it is assumed that 1) one of the receiver stations 2, namely, receiver station (A), is authorized to decrypt the information from data field (F4), 2) a D-Key value which must be generated by the receiver station (A) in order for the receiver station (A) to be able to decrypt the information from data field (F4) is "100", 3) the KG-algorithm employed by the receiver station (A) is similar to algorithm (1) above, 4) the S-Key value retrieved within the receiver station (A) in response to the receiver station (A) receiving the Tag value from data field (F2) of the received signal is equal to "90", and 5) the U-Key value of the receiver station (A) is equal to "10". As can be appreciated, the performance of the KG algorithm by the controller 11 of the receiver station (A) in this case results in the controller 11 generating a "correct" D-Key value of "100". As another example, for a case in which receiver station (B) is not authorized to decrypt the information from data field (F4), and hence, where the U-Key value accessed within the receiver station (B) is not equal to "10", the performance of the KG algorithm by the controller 11 of the receiver station (B) results in the controller 11 generating an incorrect D-Key value (e.g., a value which is not equal to "100").

As discussed above, it is within the scope of the present invention for the controller 11 to calculate a D-Key value at the time a S-Key value is originally received by a receiver station (A–D) from the information signal transmitted by the transmitter station 6. In this case, and as was previously described, the D-Key value is stored in memory 12 at a location identified by a corresponding Tag value. Also in this embodiment, the controller 11 responds to receiving the first signal and to determining that one of the stored Tag values (T1)–(Tn) is equal to the received Tag value by retrieving the D-Key value stored at the storage location in memory 12 identified by the received Tag value, and by then forwarding the retrieved D-Key value to DPB 16 (which uses the value to decrypt the encrypted information in the manner described below). As can be appreciated, for this embodiment the KG Algorithm does not need to be executed in response to the receiver stations receiving the Tag values from the first signal.

As noted above, in another embodiment of the invention the signal broadcast by the transmitter station 6 to the receiver stations 2 does not include the Tag Sync Field, the Tag Value, or the Crypto Sync Fields (F1–F3) as shown in FIG. 1a. In this embodiment the broadcast field includes only the encrypted information from data field (F4). Also in this embodiment, S-Key or D-Key values are stored in respective receiver stations 2 at memory locations identified by the Tag values wherein the Tag values are time tags. That is, the Tag values T1–Tn originally provided from the CCC 5 to the receiver stations (A–D), and stored in the memory 12 of the respective receiver stations (A–D) represent respective, predetermined time periods defining, for example, a particular day of a year and a particular time of the day (i.e., defining the start time for a respective one of the predetermined time periods P1–Pn). For example, it is assumed that the authorized receiver stations (A–D) were originally provided with a Tag value T1 that specifies a particular day of a year and a particular time of the day corresponding to a start time of period P1. In this embodiment, the CCC 5 controls the transmitter station 6 so as to begin the transmission of encrypted blocks of information B1 (in data field (F4)) corresponding to the time period P1, in response to determining that an internal clock 5a of the CCC 5 reaches the start time.

Within the authorized receiver stations (A–D) storing Tag value T1, a S-Key value (or D-Key value) is retrieved upon the occurrence of the time identified by the time tag value T1. More particularly, within the receiver stations (A–D) the controller 11 monitors the internal clock 11a and compares the time kept by the clock 11a to the stored Tag values T1–Tn. Then, upon determining that the clock 11a reaches the predetermined day of the year and time of the day specified by Tag value T1, the controller 11 retrieves the S-Key or D-Key value associated with the Tag value T1 from the memory 12. Once retrieved, and assuming that the memory 12 stores S-Key values, the controller 11 performs the KG algorithm to generate a "correct" D-Key value, and provides this value to DPB 16. As can be appreciated, in this embodiment, the transmitting station 6 also accounts for the occurrence of the time specified by the time Tag T1 so that the transmission associated with the time tag T1 is transmitted upon the occurrence of the specified time. Within the authorized receiver stations (A–D), assuming that D-Key values are stored in memory 12, and that a D-Key value was retrieved from the memory 12 (i.e., this value is a "correct" D-Key value) rather than a S-Key value, then no KG-algorithm is performed and the controller 11 merely forwards the retrieved D-Key value to DPB 16.

Within each receiver station (A–D), after the controller 11 generates or retrieves the "correct" D-Key value in accordance with the various embodiments described above, the controller 11 provides the D-Key value to the Decryption Processing Block (DPB) 16. In response to receiving the D-Key value from the controller 11, and assuming that the encrypted information has been received (from field (F4) of the first signal, the DPB 16 responds by performing the Decryption algorithm (D-algorithm) using the D-Key value and the encrypted information from data field (F4) of the first signal. The performance of the D-algorithm by the DPB 16 results in the decryption of the encrypted information from the data field (F4) of the first signal for the respective authorized receiver stations (A–D) (i.e., for a case in which a "correct" D-Key value is employed in the D-algorithm). Once decrypted, the information from data field (F4) is output in decrypted form from the DPB 16 to the back end 18 of the receiver station (A–D). However, for a case in which the receiver station (A–D) is not authorized to decrypt this information (i.e., for a case in which an "incorrect" D-Key value is employed in the D-algorithm), the performance of the D-algorithm by the DPB 16 does not result in the information from data field (F4) being decrypted, and the information is output from the DPB 16 in encrypted form to the back end 18 of the receiver station.

As can be appreciated in view of the above description, the encryption of the information included in data field (F4) enables non-authorized ones of the receiver stations 2 to be prevented from decrypting the encrypted information, while authorized ones of the receiver stations 2 are able to decrypt the encrypted information.

It should be noted that, although the foregoing description has been described in the context of the controller 11 immediately providing a generated or retrieved D-Key to the DPB 16, it is not intended that the invention be so limited. By example, in accordance with another embodiment of the invention, after the controller 11 generates or retrieves a D-Key value in the manner described above, the controller 11 simply stores the D-Key value in a memory buffer (not shown). The controller 11 does not immediately provide the D-Key value to DPB 16, but instead waits for another, later predetermined time (also referred to as a "trigger") to occur when the transmitter station 6 transmits the encrypted information which the receiver station is authorized to decrypt. For example, in this embodiment, the CCC 5 does not control the transmitter station 6 so as to transmit the encrypted information at the time period specified by Tag value T1 as described above, but instead controls the transmitter station 6 so as to transmit the information at the later predetermined time (e.g., a time and day of a year). This predetermined time period is preferably predefined by the CCC 5, and is known by the authorized receiver stations (A–D). By example, the authorized receiver stations (A–D) may have earlier received an additional Tag value $T_a$ along with the Tags values T1–Tn previously provided to the stations (A–D) in the manner described above. The Tag value $T_a$ is preferably stored in memory 12 and is also monitored by controller 11 to determine when the internal clock 11a reaches the time specified by the Tag value $T_a$. Upon the controller 11 determining that the internal clock 11a reaches the time specified by the Tag value $T_a$ (i.e., in response to the trigger), the controller 11 responds by forwarding the D-Key value from the memory buffer to DPB 16. Thereafter, in response to the respective receiver station (A–D) receiving the encryted information sent from transmitter station 6, the DPB 16 decrypts the information using the D-Key value in the manner described above.

Figure 3:
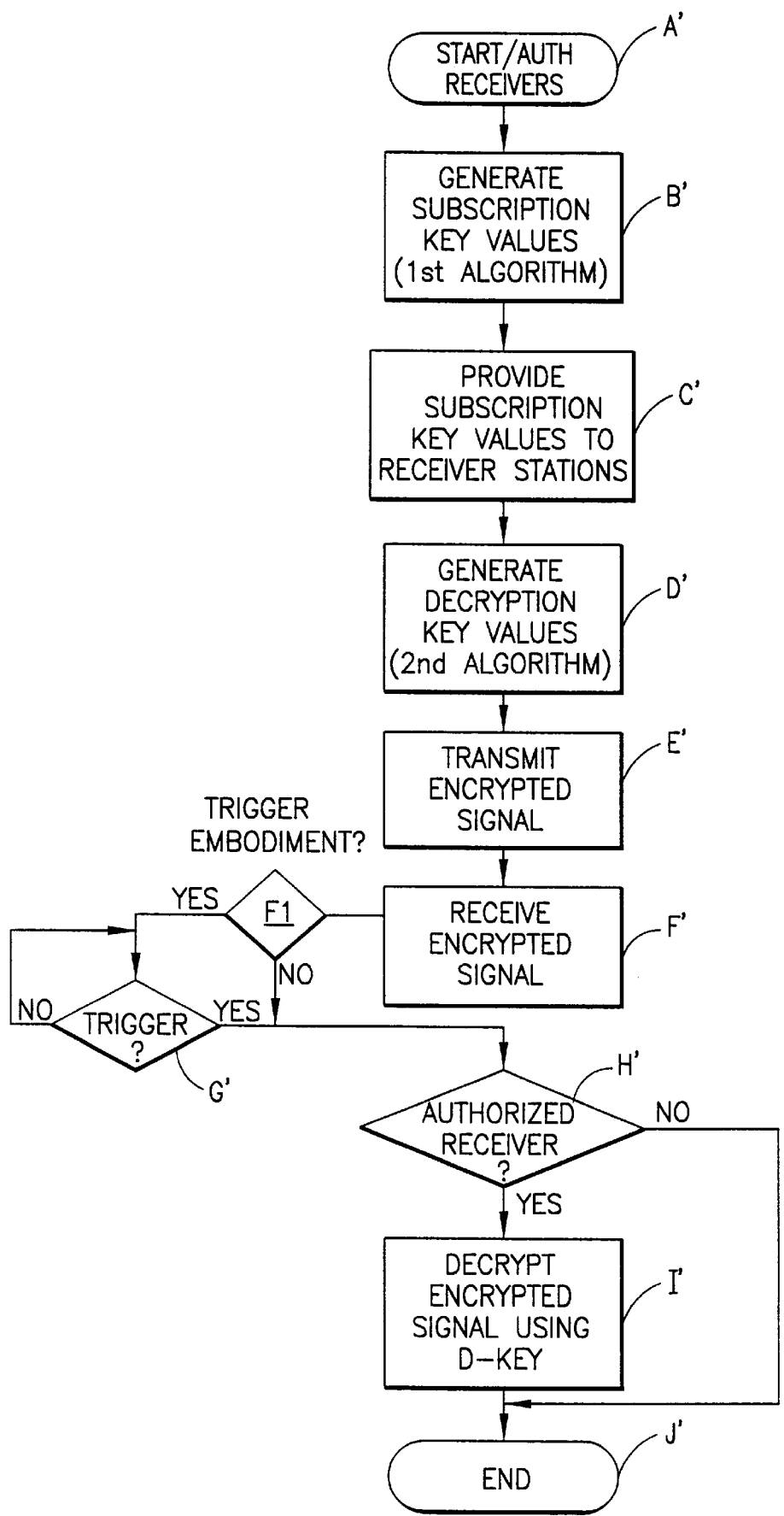
FIG. 3 shows a logic flow diagram of a method of the invention.

In view of the above description of the various embodiments of the invention, and referring to the flow diagram of FIG. 3, a method in accordance with these various embodiments of the invention will now be described. At Block A', the method begins when a CCC 5 determines that at least one authorized receiver station 2 is to receive a broadcast signal. The CCC 5 first employs, at Block B', a first algorithm to generate the S-Key values for each of the at least one authorized receiver stations. Preferably, the first algorithm is the KG algorithm which generates S-Key values as a function of D-Key values. As described above, in another embodiment, the KG algorithm generates S-Key values as a function of D-Key values and U-Key values which identifies each authorized receiver station.

At Block C', the generated S-Key values are provided to each of the respective authorized receiver stations 2. As discussed above, the S-Key values are provided to the receiver stations either via an information signal from the transmitter station 6 or with a device that enables the user of the respective authorized receiver stations to load S-Key values into authorized receivers via an user-interface.

Once the S-Key values are provided to the authorized receiver stations, the receiver stations may immediately employ, at Block D', a second algorithm. The second algorithm uses the provided S-Key values to generate a D-Key value. As was described above, in one embodiment, the provided S-Key values are first stored in the authorized receiver stations in a memory location identified by a Tag value. The Tag value may have been provided when the S-Key values were provided, or alternatively, derived from a predetermined transmission format used to provide the S-Key values. If the S-Key values are stored in the receiver stations, then the S-Key values are later retrieved by the Tag value which identifies the memory location. The retrieved S-Key value is then used within the second algorithm to generate the D-Key. The retrieval process may be initiated at a predetermined time period, or by the receipt of a signal from the transmitter station 6. The signal from the transmitter 6 which initiates the retrieval process is preferably a broadcast signal which includes encrypted information and the Tag values which identify memory locations of the appropriate S-Key values to be used by the second algorithm. As discussed above, in an alternate embodiment from storing the S-Key values, the receiver station may perform the second algorithm immediately after receiving the S-Key values and thus store the generated D-Key value at a memory location identified by the Tag value. Similarly, if the D-Key values are stored they are later retrieved by Tag value. In another embodiment, Tag values are time tags which define a predetermined time period. Upon the occurrence of the predetermined time period, the controller 11 retrieves the S-Key or D-Key value stored in a memory location identified by the time tagged Tag value.

At Block E', the transmitter station 6 broadcasts a first signal which includes encrypted information. At Block F', each of the receiver stations 2 receives the first signal broadcast by the transmitter station 6. Once the first signal is received, and assuming that the "trigger" embodiment is being employed ("y" at block F1), in response to a trigger, each of the receiver stations attempts to decrypt the encrypted information within the broadcast first signal. As discussed above, the trigger (evaluated at Block G') may be the occurrence of a predetermined time (e.g., the time when the transmitter station 6 broadcasts the first signal). In the non-trigger embodiments ('n" at block F1), once the first signal is received, each of the receiver stations attempts to decrypt the encrypted information within the broadcast first signal.

In Blocks H' and I' it is illustrated that only the respective authorized receiver stations are capable of decrypting the encrypted information within the broadcasted first signal. The decryption process is accomplished by employing a third algorithm which uses the D-Key to decrypt the encrypted information. As discussed above, non-authorized receiver stations are unable to decrypt the encrypted information. The method ends at Block J'.

Figure 4A:
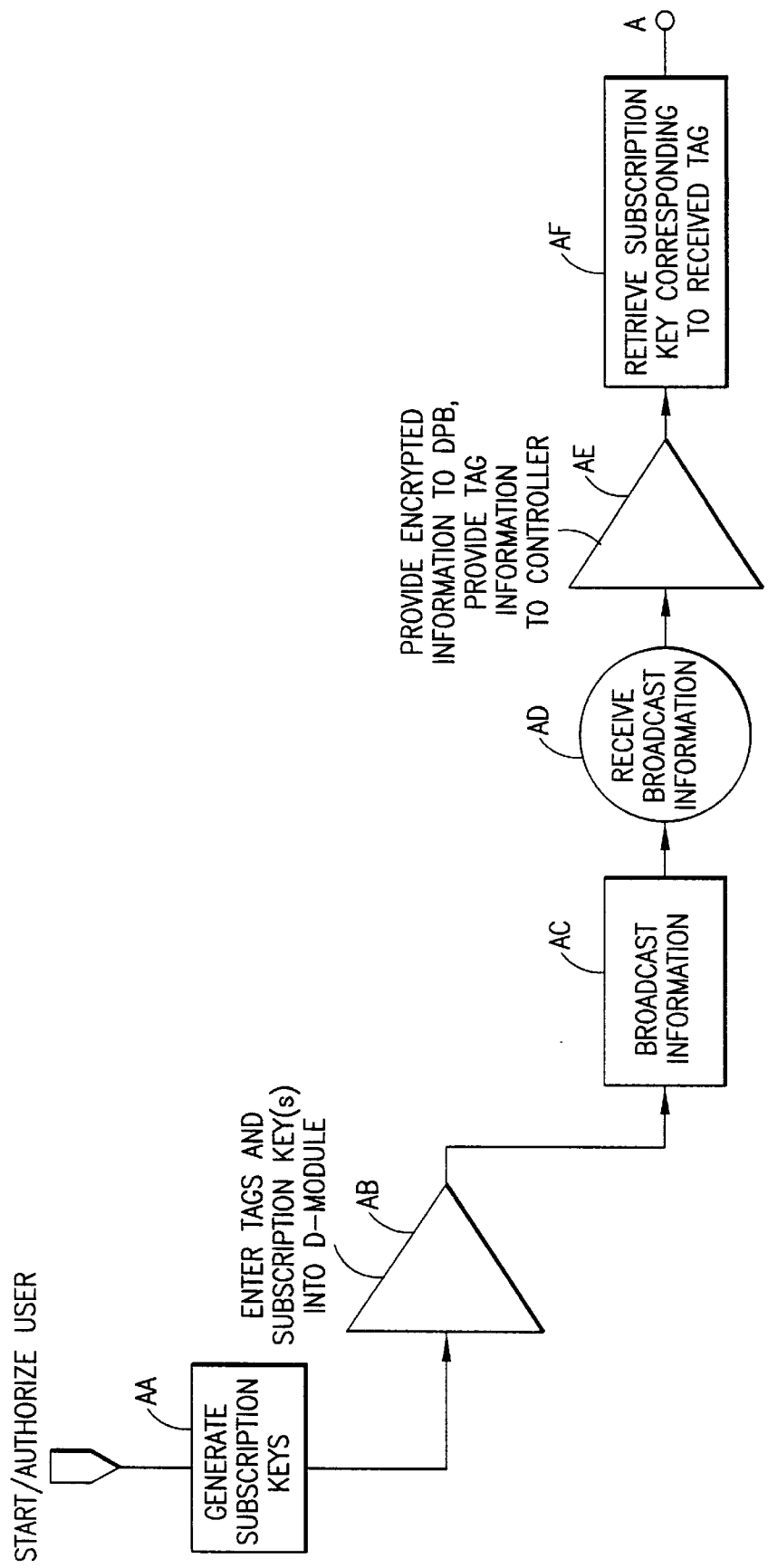
FIGS. 4a and 4b show a logic flow diagram of a method in accordance with one embodiment of the invention.
Figure 4B:
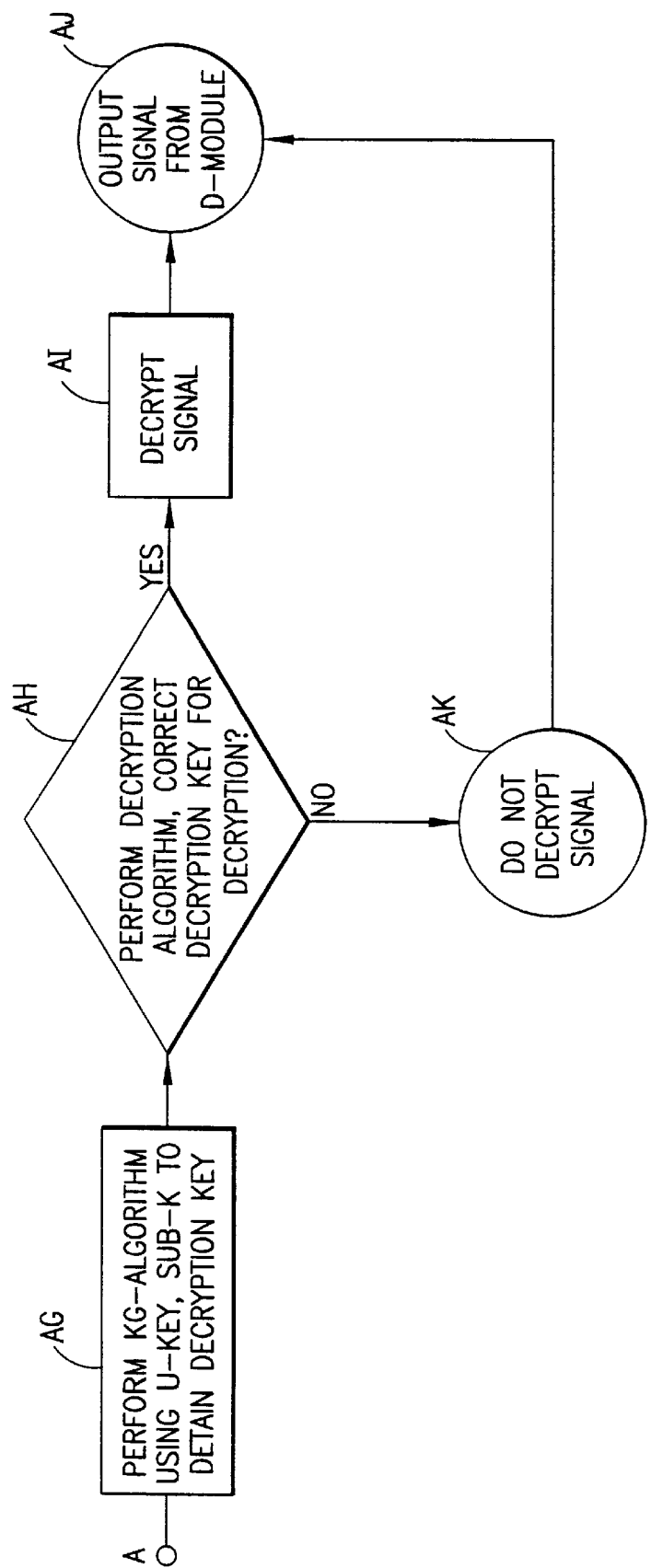

Referring now to FIGS. 4a and 4b, a method in accordance with one of the embodiments of the invention for decrypting information broadcast by the transmitter station will now be described (i.e., the embodiment is one where the receiver stations (A–D) employ the second algorithm to generate D-Key values in response to receiving a signal from the transmitter station 6 including Tag values). In the following description it is assumed that there are four receiver stations 2 in the BDAC communication system 1, namely, receiver station (A), receiver station (B), receiver station (C), and receiver station (D). It is also assumed that the values of UID and U-Key stored in the memory 8' of each receiver station (A), (B), (C), and (D) are similar to those respective ones shown in Table 1.

TABLE 1

| RECEIVER STATION | USER ID | USER KEY (SECRET) |
| --- | --- | --- |
| A | 590104 | 98 |
| B | 590618 | 72 |

TABLE 1-continued

| RECEIVER STATION | USER ID | USER KEY (SECRET) |
| --- | --- | --- |
| C | 890420 | 36 |
| D | 921013 | 20 |

It is also assumed that the KG-Algorithm employed by the Communications Control Center 5 and the receiver stations (A–D) is represented by the algorithm (1), which is repeated here for convenience:

$$D\text{-}Key = U\text{-}Key + S\text{-}Key \quad (1)$$

It is further assumed that each receiver station (A), (B), (C), and (D) is authorized to decrypt information that is to be broadcast from the transmitter station 6 within time periods (P1–P5) indicated by "yes" in Table 2, and that the receiver stations (A), (B), (C), and (D) are not authorized to decrypt information that is to be broadcast from the transmitter station 6 within time periods (P1–P5) indicated by "no" in Table 2.

TABLE 2

| RECEIVER STATION | P1 | P2 | P3 | P4 | P5 |
| --- | --- | --- | --- | --- | --- |
| A | yes | yes | yes | yes | yes |
| B | yes | yes | no | no | no |
| C | no | yes | no | no | no |
| D | yes | yes | yes | yes | no |

It is further assumed that 1) the encrypted portion of the information to be transmitted from transmitter station 6 during respective ones of the time periods P1–P5 is encrypted in accordance with the respective encryption algorithms EA1–EA5 shown in Table 3, and 2) the corresponding, "correct" D-Key values (i.e., values must be generated by the authorized receiver stations in order to decrypt the information) are those shown in Table 3.

TABLE 3

| Time Period | Encryption Algorithm | Decryption Key |
| --- | --- | --- |
| P1 | EA1 | 102 |
| P2 | EA2 | 152 |
| P3 | EA3 | 123 |
| P4 | EA4 | 225 |
| P5 | EA5 | 204 |

In Block AA of FIG. 4a, the Communications Control Center 5 determines the S-Key values which will enable the authorized ones of the receiver stations (A–D) to generate the correct D-Key values for decrypting the information, in a manner as was described above. In this example, the respective S-Key values which will enable receiver stations (A), (B), (C), and (D) to generate the D-Key values (shown in Table 3) are shown in Table 4. Also shown in Table 4 are the Tag values associated with the respective S-Key values and, where a receiver station (A)–(D) is not authorized for a particular time period P1–P5, this is indicated in Table 4 with the S-Key value of "00 (not authorized)".

In Block AB, the S-Key and Tag values for the authorized ones of the receiver stations (A–D) are provided to these receiver stations, and are entered into the memory 12 of the D-module 10 of the respective authorized receiver stations, in the manner described above. In this example, it is assumed that all of the S-Key values of Table 4, not including the values "00 (not authorized)", are provided to the authorized receiver stations (A)–(D) in data fields of an information signal similar to that of FIG. 1b.

encrypted information from data field (F4) of the received signal. If the D-Key value is a "correct" value (indicated by "Y" in FIG. 4b), then the performance of the D-algorithm by

TABLE 4

| TIME PERIOD | DECRYPTION KEY | TAG VALUE | RECEIVER STATION A (S-Key) | RECEIVER STATION B (S-Key) | RECEIVER STATION C (S-Key) | RECEIVER STATION D (S-Key) |
|---|---|---|---|---|---|---|
| P1 | 102 | A-01 | 004 | 030 | 00 (not authorized) | 082 |
| P2 | 152 | A-02 | 054 | 080 | 116 | 132 |
| P3 | 123 | A-03 | 025 | 00 (not authorized) | 00 (not authorized) | 103 |
| P4 | 225 | A-04 | 127 | 00 (not authorized) | 00 (not authorized) | 205 |
| P5 | 204 | A-05 | 106 | 00 (not authorized) | 00 (not authorized) | 00 (not authorized) |

In Block AC, information including data fields (F1)–(F4) (FIG. 1a) is broadcast by the transmitter station 6 during time period P1. The data field (F2) includes a Tag Value (A-01) which corresponds to one of the Tag values T1–Tn stored in memory 12 of the receiver stations (A), (B), and (D) that are authorized for this time period P1. After the information is relayed by the satellite 4, it is received by the receiver stations (A)–(D) (Block AD) in view of the satellite 4, and is then demodulated and converted to baseband by the front end block 14 of each receiver station (A)–(D). The front end block 14 also extracts at least the Tag information from data field (F2) of the received signal and provides this information to the controller 11 of the respective receiver station (A)–(D). The front end block 14 of each receiver station (A)–(D) also forwards the encrypted information from data field (F4) of the received signal to the Decryption Processing Block 16 (Block AE).

In Block AF, in response to receiving the Tag value (A-01) from the front end block 14, the controller 11 of each receiver station (A)–(D) compares this value to each Tag value T1–Tn stored in memory 12 of the receiver station (A)–(D) to determine if the received Tag value (A-01) equals any of the stored Tag values (T1–Tn). If it is determined that the received Tag value (A-01) equals one of the stored Tag values T1–Tn, then the controller 11 retrieves the value of the S-Key (S-Key1)–(S-Keyn) stored at a storage location in memory 12 identified by the stored Tag value, and then performs the KG-Algorithm using the receiver station's U-Key value and the retrieved S-Key value to generate a D-Key value (Block AG). As can be appreciated in view of Table 4, in this example the values of the S-Keys retrieved within receiver stations (A), (B), (C), and (D), as a result of the performance of Block AG, are "004", "030", "00", and "082", respectively. Also in this example, the performance of the KG algorithm within each of the receiver stations (A), (B), and (D) results in the generation of a "correct" D-Key value of "102", and the performance of the KG algorithm within receiver station (C) results in the generation of an "incorrect" D-Key value of "36".

As was described above, within each receiver station (A)–(D), after the controller 11 generates the D-Key value, the controller 11 provides the D-Key value to the Decryption Processing Block (DPB) 16. The DPB 16 responds to receiving the D-Key value by performing the D-algorithm in Block AH, using the D-Key (from Block AG) and the the DPB 16 causes the encrypted information to be decrypted (Block AI), and the decrypted information is then output from the DPB 16 to the back end 18 of the receiver (Block AJ). For example, since in this example the performance of Block AG by the receiver stations (A), (B), and (D) resulted in the "correct" D-Key value of "102" being generated, the performance of the D-algorithm by the DPB 16 of these receiver stations (A), (B), and (D) causes the information from data field (F4) of the received signal to be decrypted.

If the D-Key value is an "incorrect" value (indicated by "N" in FIG. 4b), then the performance of the D-algorithm by the DPB 16 does not cause the encrypted information to be decrypted (Block AK), and the information is output from the D-module in encrypted form (Block AJ). By example, since the D-Key value generated within the receiver station (C) in Block AG was an incorrect value (e.g., "36" rather than "102"), the performance of the D-algorithm by the DPB 16 of receiver station (C) does not result in the information from data field (F4) being decrypted.

Thereafter, for the information transmitted from transmitter station 6 during each of the respective time periods P2–P5, the method of FIGS. 4a and 4b is again performed in a similar manner as was described above. The values of the S-Keys employed for these respective time periods P2–P5 are those shown in Table 4 in the rows corresponding to the respective time periods P2–P5. Also, the value of the D-Keys employed for these time periods P2–P5 are those shown in the rows corresponding to these time periods P2–P5 listed in Table 4. As can be appreciated in view of the U-Key values shown in Table 3, and in view of the S-Key and D-Key values shown in Table 4, for time period P2, all of the receiver stations (A)–(D) generate a correct D-Key value of "152" in Block AG, and thus decrypt the information broadcast from transmitter station 6 during time period P2, by performing the D-algorithm (Blocks AH and AI). As can also be appreciated, for time periods P3 and P4, only receiver stations (A) and (D) generate correct D-Key values of "123" and "225" for these respective time periods P3 and P4 (Block AG), and decrypt information broadcast from transmitter station 6 during these time periods P3 and P4, by performing the D-algorithm (Blocks AH and AI). For time periods P3 and P4, receiver stations (B) and (C) generate incorrect D-Key values of "72" and "36" (Block AG), respectively, and thus do not decrypt the information broadcast from the transmitter station 6 during these respective time periods P3 and P4. As can further be appreciated, for time period P5, only receiver station (A) generates a correct D-Key value of "204" (Block AG) and decrypts information broadcast from transmitter station 6 during this time period P5, by performing the D-algorithm (Blocks AH and AI).

Having described various embodiments of the invention, an advantage provided by the BDAC communication system 1 will now be described. The advantage relates to the use of the KG algorithm and the D-algorithm. More particularly, because a "correct" D-Key value must be generated within a receiver station (A–D) in order for the receiver station (A–D) to be able to successfully decrypt received information, and because a receiver station (A–D) can only generate a "correct" D-Key value if a predetermined, unique S-Key is first employed in the KG algorithm within the receiver station (A–D), it can be appreciated that the use of the BDAC communication system 1 reduces the possibility that a non-authorized receiver station could successfully decrypt encrypted information received from the transmitter station 6. Also, because the D-Key value is generated internally within a receiver station (A–D) after the performance of the KG algorithm, and because the D-Key value is based on, for example, a unique U-Key value stored in permanent memory 8', there is little possibility that a correct D-Key generated by an authorized receiver station (A–D) can be determined externally, and be successfully employed in a non-authorized receiver station (A–D) for decrypting information. It can therefore be appreciated that the BDAC communication system 1 of the invention provides a high degree of security against non-authorized receiver stations obtaining access to decrypted information originally broadcast by the transmitter station 6 in encrypted form.

While the invention has been particularly shown and described with respect to preferred embodiments thereof, it will be understood by those skilled in the art that changes in form and details may be made therein without departing from the scope and spirit of the invention. By example, no communication satellite 4 need be employed in cases in which the transmitter station 6 can communicate directly with the receiver stations 2.

What is claimed is:

1. A method for enabling only authorized ones of a plurality of receiver stations to obtain access to first information transmitted by a transmitter station, the method comprising the steps of:
   at the transmitter station, performing a first predefined algorithm to generate Subscription Key values for individual ones of the respective authorized receiver stations, wherein the first predefined algorithm is a function of a predetermined Decryption Key value;
   providing the Subscription Key values to the individual ones of the respective authorized receiver stations;
   at each of the authorized receiver stations, performing a second predefined algorithm using the Subscription Key value provided to the authorized receiver station, and generating a resultant value that equals the predetermined Decryption Key value;
   transmitting a first signal from the transmitter station, the first signal including an encrypted version of the first information;
   receiving the first signal at each of the receiver stations, and within each individual one of the authorized receiver stations, performing a third predefined algorithm using the resultant value to decrypt the encrypted version of the first information, thereby enabling the authorized receiver station to obtain access to the first information in decrypted form.

2. A method as set forth in claim 1, wherein the step of performing the first predefined algorithm is performed using User Key values of the respective authorized receiver stations, and wherein the step of performing the second predefined algorithm within each authorized receiver station is performed using the User Key value of the respective authorized receiver station.

3. A method as set forth in claim 1, wherein the step of providing the Subscription Key values is performed by:
   transmitting an information signal from the transmitter station, the information signal including (a) the Subscription Key values for the respective authorized receiver stations, (b) Tag values corresponding to respective ones of the Subscription Key values, and (c) UID values;
   receiving the information signal at each of the receiver stations, and within each receiver station:
      comparing the UID values from the information signal to a UID value stored in the receiver station, and, if any of the UID values from the information signal are equal to the UID value stored in the receiver station,
      storing the Subscription Key value and the Tag value corresponding to the Subscription Key value in the receiver station at a storage location identified by the Tag value.

4. A method as set forth in claim 1, wherein the step of providing the Subscription Key values is performed by:
   transmitting an information signal from the transmitter station, the information signal including the Subscription Key values for the respective authorized receiver stations;
   receiving the information signal at each of the receiver stations; and within each receiver station:
      deriving Tag values and UID values corresponding to respective ones of the Subscription Key values,
      comparing the derived UID values to a UID value stored in the receiver station, and, if any of the derived UID values are equal to the UID value stored in the receiver station,
      storing the Subscription Key value and the derived Tag value corresponding to the Subscription Key value in the receiver station at a storage location identified by the derived Tag value.

5. A method as set forth in claim 4, wherein the step of deriving Tag values and UID values includes the steps of:
   parsing the information signal received at each of the receiver stations according to a predetermined data transmission format; and
   assigning a predetermined Tag value and UID value corresponding to respective one of the Subscription Key values parsed from the information signal according to the predetermined data transmission format.

6. A method as set forth in claim 1, wherein the step of providing the Subscription Key values is performed by storing the respective Subscription Key values in the respective authorized receiver stations.

7. A method as set forth in claim 6, wherein the step of storing the respective Subscription Key values in the respective authorized receiver stations is performed via a user-interface.

8. A method as set forth in claim 7, wherein prior to the step of storing the respective Subscription Key values, a step is performed of:

providing storage devices wherein are stored respective ones of the Subscription Key values, and wherein the step of storing is performed by loading the Subscription Key values from the storage devices into the respective authorized receiver stations.

9. A method for enabling only authorized ones of a plurality of receiver stations to obtain access to first information transmitted by a transmitter station, the method comprising the steps of:

at the transmitter station, performing a first redefined algorithm to generate Subscription Key values for the respective authorized receiver stations, wherein the first predefined algorithm is a function of a predetermined Decryption Key value;

providing the Subscription Key values to the respective authorized receiver stations;

at each of the authorized receiver stations, performing a second predefined algorithm using the Subscription Key value provided to the authorized receiver station, and generating a resultant value that equals the predetermined Decryption Key value;

transmitting a first signal from the transmitter station, the first signal including an encrypted version of the first information;

receiving the first signal at each of the receiver stations, and within each individual one of the authorized receiver stations, performing a third predefined algorithm using the resultant value to decrypt the encrypted version of the first information, thereby enabling the authorized receiver station to obtain access to the first information in decrypted form, wherein the provided Subscription Key values are stored in the respective authorized receiver stations at storage locations identified by Tag values, the step of performing the second predetermined algorithm further includes the steps of:

prior to performing the second predetermined algorithm and in response to an expiration of a predetermined time period, retrieving the stored Subscription key value associated with the Tag value corresponding to the predetermined time period; and performing the second predetermined algorithm with the retrieved Subscription Key value.

10. A method as set forth in claim 1, wherein the step of transmitting is performed prior to the step of performing the second predefined algorithm, and the provided Subscription Key values are stored in the respective authorized receiver stations at storage locations identified by respective first Tag values, wherein the first signal also includes respective second tag values for the respective authorized receiver stations, and wherein within each authorized receiver station, the step of performing the second predetermined algorithm further includes the steps of:

prior to performing the second predetermined algorithm and in response to receiving the first signal, comparing the second Tag value of the first signal to each of the Tag values stored in the authorized receiver station, and if any of the stored Tag values are equal;

retrieving the Subscription Key value stored in the authorized receiver station at the storage location identified by the second Tag value; and performing the second predetermined algorithm with the retrieved Subscription Key value.

11. A method for enabling only authorized ones of a plurality of receiver stations to obtain access to first information transmitted by a transmitter station, the method comprising the steps of:

at the transmitter station, performing a first predefined algorithm to generate Subscription Key values for the respective authorized receiver stations, wherein the first predefined algorithm is a function of a predetermined Decryption Key value;

providing the Subscription Key values to the respective authorized receiver stations;

at each of the authorized receiver stations, performing a second predefined algorithm using the Subscription Key value provided to the authorized receiver station, and generating a resultant value that equals the predetermined Decryption Key value;

transmitting a first signal from the transmitter station, the first signal including an encrypted version of the first information;

receiving the first signal at each of the receiver stations, and within each individual one of the authorized receiver stations, performing a third predefined algorithm using the resultant value to decrypt the encrypted version of the first information, thereby enabling the authorized receiver station to obtain access to the first information in decrypted form, wherein the step of providing includes providing the Subscription Key values and respective Tag values to the respective authorized receiver stations, and the step of generating the resultant value further includes the step of:

storing in the authorized receiver station the resultant value and the Tag value corresponding to the Subscription Key value provided to the authorized receiver station at a storage location identified by the Tag value.

12. A method for enabling only authorized ones of a plurality of receiver stations to obtain access to first information transmitted by a transmitter station, the method comprising the steps of:

at the transmitter station, performing a first predefined algorithm to generate Subscription Key values for the respective authorized receiver stations, wherein the first predefined algorithm is a function of a predetermined Decryption Key value;

providing the Subscription Key values to the respective authorized receiver stations;

at each of the authorized receiver stations, performing a second predefined algorithm using the Subscription Key value provided to the authorized receiver station, and generating a resultant value that equals the predetermined Decryption Key value;

transmitting a first signal from the transmitter station, the first signal including an encrypted version of the first information;

receiving the first signal at each of the receiver stations, and within each individual one of the authorized receiver stations, performing a third predefined algorithm using the resultant value to decrypt the encrypted version of the first information, thereby enabling the authorized receiver station to obtain access to the first information in decrypted form, wherein the third predefined algorithm is performed in response to an occurrence of a triggering event, the triggering event being an occurrence of a predetermined time.

13. A method for enabling only authorized ones of a plurality of receiver stations to obtain access to first information transmitted by a transmitter station, the method comprising the steps of:

at the transmitter station, performing a first predefined algorithm to generate Subscription Key values for the respective authorized receiver stations, wherein the first predefined algorithm is a function of a predetermined Decryption Key value;

providing the Subscription Key values to the respective authorized receiver stations;

at each of the authorized receiver stations, performing a second predefined algorithm using the Subscription Key value provided to the authorized receiver station, and generating a resultant value that equals the predetermined Decryption Key value;

transmitting a first signal from the transmitter station, the first signal including an encrypted version of the first information;

receiving the first signal at each of the receiver stations, and within each individual one of the authorized receiver stations, performing a third predefined algorithm using the resultant value to decrypt the encrypted version of the first information, thereby enabling the authorized receiver station to obtain access to the first information in decrypted form, wherein the third predefined algorithm is performed in response to an occurrence of a triggering event, the triggering event being an occurrence of a predetermined time-of-day.

14. A method as set forth in claim 13, wherein upon the occurrence of the triggering event, the transmitter station broadcasts the first signal.

15. A method for enabling an authorized receiver station to decrypt encrypted information transmitted by a transmitter station, and for decrypting the encrypted information with the authorized receiver station, the method comprising the steps of:

storing a predetermined Subscription Key value in the authorized receiver station;

retrieving the predetermined Subscription Key value stored in the authorized receiver station;

performing a first predefined algorithm within the authorized receiver station using the predetermined Subscription Key value and a unique non-public value that is prestored in the authorized receiver station, to generate a Decryption Key value;

transmitting a signal from the transmitter station, the signal including the encrypted information;

receiving the signal at the authorized receiver station; and within the authorized receiver station, performing a second predefined algorithm using the Decryption key value to decrypt the encrypted information.

16. A method for enabling an authorized receiver station to decrypt encrypted information transmitted by a transmitter station, and for decrypting the encrypted information with the authorized receiver station, the method comprising the steps of:

storing a predetermined Subscription Key value in the authorized receiver station;

retrieving the predetermined Subscription Key value stored in the authorized receiver station;

performing a first predefined algorithm within the authorized receiver station using the predetermined Subscription Key value, to generate a Decryption Key value;

transmitting a signal from the transmitter station, the signal including the encrypted information;

receiving the signal at the authorized receiver station; and within the authorized receiver station, performing a second predefined algorithm using the Decryption key value to decrypt the encrypted information, wherein the second predefined algorithm is performed in response to an occurrence of a triggering event, the triggering event being an occurrence of a predetermined time.

17. A method as set forth in claim 16, wherein the predetermined time is specified by the transmitter station.

18. A method as set forth in claim 15, wherein the first predefined algorithm is a function of (a) the predetermined Subscription Key value and (b) the unique, non-public value that is prestored in the authorized receiver station as a User Key value.

19. A method for enabling an authorized receiver station to decrypt encrypted information transmitted by a transmitter station, and for decrypting the encryted information with the authorized receiver station, the method comprising the steps of:

storing a predetermined Subscription Key value in the authorized receiver station;

retrieving the predetermined Subscription Key value stored in the authorized receiver station;

performing a first predefined algorithm within the authorized receiver station using the predetermined Subscription Key value, to generate a Decryption Key value;

transmitting a signal from the transmitter station, the signal including the encrypted information;

receiving the signal at the authorized receiver station; and within the authorized receiver station, performing a second predefined algorithm using the Decryption key value to decrypt the encrypted information, wherein the first predefined algorithm is a function of (a) the predetermined Subscription Key value and (b) a User Key value stored in the authorized receiver station, and wherein prior to the performance of the step of storing, the predetermined Subscription Key value is determined by performing the first predefined algorithm using a first value that is predetermined to be equal to the Decryption Key value and a second value that equals the User Key value.

20. A method as set forth in claim 15, wherein prior to the performance of the step of storing, steps are performed of:

transmitting an information signal from the transmitter station, the information signal including the predetermined Subscription Key value, a corresponding Tag value, and a corresponding UID value;

receiving the information signal at the authorized receiver station;

within the authorized receiver station, comparing the UID value from the information signal to a UID value stored in the authorized receiver station; and if they are equal, performing the step of storing; and performing a further step of storing the Tag value in a manner so that the Tag value identifies the predetermined Subscription Key value stored in the authorized receiver station.

21. A method as set forth in claim 20, wherein the first information specifies the Tag value, and wherein the step of retrieving is performed by:

comparing the Tag value of the first information to the Tag value stored in the authorized receiver station, and if they are equal, retrieving the Subscription Key and generating decryption Key values identified by the Tag value stored in the authorized receiver station.

22. A Broadcast Data Access Controller (BDAC) communication system, comprising:

at least one transmitter station;

at least one authorized receiver station, said at least one authorized receiver station including storage means for storing at least one predetermined Subscription Key value and a unique, non-public value;

first control means coupled to said transmitter station, said first control means for transmitting a first signal from said transmitter station to said authorized receiver station, said first signal including first information encrypted in accordance with a predefined encryption algorithm and second information specifying that said predetermined Subscription Key value be accessed within said authorized receiver station;

second control means coupled to said receiving station, said second control means being responsive to said second information for accessing said Subscription Key value and said unique, non-public value stored in said storage means and for performing a first predefined algorithm based on said accessed Subscription Key value and on said unique, non-public value to generate a Decryption Key value; and means coupled to said second control means for performing a second predefined algorithm based on said Decryption Key value to decrypt said encrypted first information of said first signal.

23. A BDAC communication system as set forth in claim 22, wherein said unique, non-public value is a User Key value, and wherein said first predefined algorithm operates on said User Key value and said Subscription Key value accessed by said second control means.

24. A BDAC communication system as set forth in claim 22, wherein said receiver station further stores a UID value, wherein said first control means is also for transmitting a second signal from said transmitter station prior to said transmission of said first signal, wherein said second signal includes said at least one predetermined Subscription Key value and a corresponding at least one UID value, and wherein said second control means is responsive to said second signal for comparing said at least one UID value from said second signal to said stored UID value and for storing said at least one Subscription Key value from said second signal in said first storage means if said at least one UID value from said second signal equals said stored UID value.

25. A BDAC communication system as set forth in claim 22, wherein said second control means and said means for performing said second predefined algorithm form a Decryption module, said Decryption module being detachably coupled to said at least one receiver station.

26. A BDAC communication system as set forth in claim 25, wherein said unique, non-public value is a User Key value, wherein said Decryption module further comprises a further storage means for storing said User Key value, and wherein said first predefined algorithm operates on said User Key value and said Subscription Key value accessed by said second control means.

27. A BDAC communication system as set forth in claim 26, wherein said further storage means also stores a UID value, and wherein said UID value is externally readable and said User Key value is not externally readable.

28. A method for enabling only authorized ones of a plurality of receiver stations to obtain access to first information transmitted by a transmitter station, the method comprising the steps of:

performing a first predefined algorithm to generate Subscription Key values for the respective authorized receiver stations, wherein the first predefined algorithm is function of a predetermined Decryption Key value;

providing the Subscription Key values to the respective authorized receiver stations;

transmitting a signal from the transmitter station, the signal including an encrypted version of the first information, the signal also including second information;

receiving the signal at each of the receiver stations; and within each individual one of the authorized receiver stations:

performing a second predefined algorithm using the Subscription Key value provided to the authorized receiver station in combination with a unique, non-public value that is prestored in the authorized receiver station, and generating a resultant value that equals the predetermined Decryption Key value, and performing a third predefined algorithm using the resultant value to decrypt the encrypted version of the first information, thereby enabling the authorized receiver station to obtain access to the first information in decrypted form.

29. A method as set forth in claim 1, wherein the step of providing includes the steps of:

transmitting an information signal from the transmitter station, the information signal including the predetermined Subscription Key values, the predetermined Subscription Key values being in a predetermined sequence;

receiving the information signal at the authorized receiver stations; and within each authorized receiver station, performing steps of:

selecting at least one of the Subscription Key values from the information signal, based on the predetermined sequence of the Subscription Key values; and storing the selected at least one Subscription Key value.

30. A method as set forth in claim 11, wherein the Tag value stored in the authorized receiver station specifies a particular time, and within the authorized receiver station, prior to the performance of the third predefined algorithm, steps are performed of:

recognizing an occurrence of the particular time specified by the Tag value stored in the authorized receiver station; and retrieving the stored resultant value associated with the Tag value specifying the particular time, wherein the step of performing the third predefined algorithm within the authorized receiver station is performed in response to the retrieving step.

31. A method as set forth in claim 11, wherein the first signal also includes respective Tag values for the respective authorized receiver stations, and wherein within each authorized receiver station, further steps are performed of:

prior to performing the third predefined algorithm and in response to receiving the first signal, comparing the Tag values from the first signal to the Tag value stored in the authorized receiver station to determine whether any of the Tag values from the first signal are equal to the Tag value stored in the authorized receiver station, and if any one of the Tag values from the first signal is determined to be equal to the Tag value stored in the authorized receiver station, performing steps of:

retrieving the resultant value from the storage location identified by the Tag value stored in the authorized receiver station, and wherein the step of performing the third predefined algorithm is performed in response to the retrieving step.

32. A method for enabling an authorized receiver station to decrypt encrypted information transmitted by a transmitter station, and for decrypting the encrypted information with the authorized receiver station, the method comprising the steps of:

storing a predetermined Subscription Key value in the authorized receiver station;

retrieving the predetermined Subscription Key value stored in the authorized receiver station;

performing a first predefined algorithm within the authorized receiver station using the predetermined Subscription Key value, to generate a Decryption Key value;

transmitting a signal from the transmitter station, the signal including the encrypted information;

receiving the signal at the authorized receiver station; and within the authorized receiver station, performing a second predefined algorithm using the Decryption key value to decrypt the encrypted information, wherein prior to the storing step, steps are performed of:

transmitting an information signal from the transmitter station, the information signal including first and second information, the first information specifying that the predetermined Subscription Key value is being transmitted, the second information including the predetermined Subscription Key value;

receiving the information signal at the authorized receiver station; and within the authorized receiver station, performing steps of:

recognizing that the predetermined Subscription Key value is included in the received information signal, based on the first information included in the information signal, and then performing the step of storing the predetermined Subscription Key value in the authorized receiver station.

33. A method for enabling an authorized receiver station to decrypt encrypted information transmitted by a transmitter station, and for decrypting the encrypted information with the authorized receiver station, the method comprising the steps of:

storing a predetermined Subscription Key value in the authorized receiver station;

retrieving the predetermined Subscription Key value stored in the authorized receiver station;

performing a first predefined algorithm within the authorized receiver station using the predetermined Subscription Key value, to generate a Decryption Key value;

transmitting a signal from the transmitter station, the signal including the encrypted information;

receiving the signal at the authorized receiver station; and within the authorized receiver station, performing a second predefined algorithm using the Decryption key value to decrypt the encrypted information, wherein prior to the performance of the retrieving step, the authorized receiver station performs a step of recognizing an occurrence of a particular time, wherein the retrieving step is performed in response to the recognizing step, and wherein the first predefined algorithm is performed in response to the retrieving step.

34. A method as set forth in claim 33, wherein the particular time is specified by a tag value stored in said authorized receiver station.

35. A method as set forth in claim 28, wherein the step of providing the Subscription Key values is performed by:

transmitting an information signal from the transmitter station, the information signal including (a) the Subscription Key values for the respective authorized receiver stations, (b) Tag values corresponding to respective ones of the Subscription Key values, and (c) identification values associated with respective ones of the authorized receiver stations;

receiving the information signal at each of the receiver stations, and within each receiver station:

comparing the identification values from the information signal to an identification value stored in the receiver station, and, if any one of the identification values from the information signal is equal to the identification value stored in the receiver station, storing the Subscription Key value and corresponding Tag value associated with the one identification value in the receiver station at a storage location identified by the Tag value.

36. A method as set forth in claim 28, wherein the second information specifies Tag values, wherein the provided Subscription Key values are stored in the authorized receiver stations at storage locations identified by respective Tag values, and wherein in response to receiving the second information, and prior to the performance of the second predefined algorithm, each authorized receiver station performs steps of:

comparing the Tag values from the second information to the Tag values stored in the authorized receiver station, and, if any of the Tag values from the second information signal are equal to any one of the Tag values stored in the authorized receiver station, retrieving the Subscription Key value stored at the storage location identified by the stored Tag value, wherein the second predefined algorithm is performed using the Subscription Key value retrieved in the retrieving step.

37. A method for enabling only authorized ones of a plurality of receiver stations to obtain access to first information transmitted by a transmitter station, the method comprising the steps of:

performing a first predefined algorithm to generate Subscription Key values for the respective authorized receiver stations, wherein the first predefined algorithm is function of a predetermined Decryption Key value;

providing the Subscription Key values to the respective authorized receiver stations;

transmitting a signal from the transmitter station, the signal including an encrypted version of the first information, the signal also including second information;

receiving the signal at each of the receiver stations;

and within each individual one of the authorized receiver stations:

performing a second predefined algorithm using the Subscription Key value provided to the authorized receiver station, and generating a resultant value that equals the predetermined Decryption Key value, and performing a third predefined algorithm using the resultant value to decrypt the encrypted version of the first information, thereby enabling the authorized receiver station to obtain access to the first information in decrypted form, wherein in response to the resultant value being generated, the resultant value is stored at a storage location identified by a respective Tag value, wherein the receiving step is performed after the performance of the second predefined algorithm, wherein the second information specifies Tag values, and wherein in response to receiving the signal, the authorized receiver station performs steps of:

comparing the Tag values from the second information to the respective Tag value stored in the authorized receiver station, and, if any of the Tag values from the second information signal are equal to the respective Tag value stored in the authorized receiver station, retrieving the resultant value stored at the storage location identified by the Tag value stored in the authorized receiver station, and wherein the third predefined algorithm is performed in response to the retrieving step.

38. A decryption module, comprising:

a memory, said memory storing at least one first predetermined value and a second predetermined value that comprises a unique, non-public value;

a controller, said controller being bidirectionally coupled to said memory, said controller for retrieving the at least one first predetermined value and said second predetermined value that comprises said unique, non-public value from said memory for performing a first predefined algorithm based on the at least one first predetermined value and said second predetermined value to generate a resultant value; and a decryption processor, said decryption processor being bidirectionally coupled to said controller, said decryption processor also for being bidirectionally coupled to a front end block of a receiver station that is in communication with a transmitter station which broadcasts encrypted information, said decryption processor for performing a second predefined algorithm using the resultant value generated by said controller to decrypt the encrypted information after the encrypted information is received by said front end block and provided to said decryption processor.

39. A decryption module, comprising:

a memory, said memory storing at least one first predetermined value;

a controller, said controller being bidirectionally coupled to said memory, said controller for retrieving the at least one first predetermined value from said memory for performing a first predefined algorithm based on the at least one first predetermined value to generate a resultant value; and a decryption processor, said decryption processor being bidirectionally coupled to said controller, said decryption processor also for being bidirectionally coupled to a front end block of a receiver station that is in communication with a transmitter station which broadcasts encrypted information, said decryption processor for performing a second predefined algorithm using the resultant value generated by said controller to decrypt the encrypted information after the encrypted information is received by said front end block and provided to said decryption processor, wherein the at least one first predetermined value is stored in the memory at a storage location identified by a respective Tag value, the respective Tag value specifying a particular time, wherein the controller includes means for recognizing an occurrence of the particular time specified by the Tag value, and wherein the controller retrieves the at least one first predetermined value from said memory for performing the first predefined algorithm in response to said recognizing means recognizing the occurrence of the particular time specified by the Tag value.

40. A decryption module as set forth in claim 38, wherein after said controller generates said resultant value said controller stores said resultant value in said memory at a storage location identified by a respective Tag value, the respective Tag value specifying a particular time, wherein the controller includes means for recognizing an occurrence of the particular time specified by the Tag value, and wherein the controller retrieves the resultant value from said memory and provides said resultant value to said decryption processor in response to said recognizing means recognizing the occurrence of the particular time specified by the Tag value, said decryption processor being responsive to receiving said resultant value for performing said second predefined algorithm.

41. A decryption module, comprising:

a memory, said memory storing at least one first predetermined value;

a controller, said controller being bidirectionally coupled to said memory, said controller for retrieving the at least one first predetermined value from said memory for performing a first predefined algorithm based on the at least one first predetermined value to generate a resultant value; and a decryption processor, said decryption processor being bidirectionally coupled to said controller, said decryption processor also for being bidirectionally coupled to a front end block of a receiver station that is in communication with a transmitter station which broadcasts encrypted information, said decryption processor for performing a second predefined algorithm using the resultant value generated by said controller to decrypt the encrypted information after the encrypted information is received by said front end block and provided to said decryption processor, wherein after said controller generates said resultant value said controller stores said resultant value in said memory at a storage location identified by a respective Tag value, wherein said transmitter station broadcasts information specifying the Tag value along with the encrypted information, wherein the controller is bidirectionally coupled to said front end block for receiving the information specifying the Tag value from the front end block after the information is received by the front end block from the transmitter station, said controller being responsive to receiving the information for associating the information with the Tag value stored said memory, for subsequently retrieving the resultant value from said memory, and for then providing said resultant value to said decryption processor, said decryption processor being responsive to receiving said resultant value for performing said second predefined algorithm.

42. A decryption module as set forth in claim 38, wherein said at least one first predetermined value is stored in said memory at a storage location identified by a respective Tag value, wherein said transmitter station broadcasts information specifying the Tag value along with the encrypted information, wherein the controller is bidirectionally coupled to said front end block for receiving the information specifying the Tag value from the front end block after the information is received by the front end block from the transmitter station, said controller being responsive to receiving the information for associating the information with the Tag value stored in said memory, for subsequently retrieving the at least one first predetermined value from said memory, and for then performing the first predefined algorithm to generate the resultant value, wherein after generating the resultant value said controller provides the resultant value to said decryption processor, said decryption processor being responsive to receiving resultant value for performing said second predefined algorithm.

43. A communication system, comprising:

a transmitter station for broadcasting a signal that includes encrypted information;

at least one receiver station for receiving said signal, said at least one receiver station storing at least one first predetermined value that is input to said at least one receiver station and further storing a non-public value, related to an identification of the receiver station, that is prestored in said at least one receiver station, said at least one receiver station for performing a first predefined algorithm using the at least one predetermined value and the non-public value to generate a resultant value, said at least one receiver station also for performing a second predefined algorithm using the resultant value to decrypt the encrypted information included in the received signal.

* * * * *